(12) United States Patent
Fudemoto et al.

(10) Patent No.: US 9,770,949 B2
(45) Date of Patent: Sep. 26, 2017

(54) TIRE

(71) Applicant: BRIDGESTONE CORPORATION, Chuo-ku, Tokyo (JP)

(72) Inventors: Hiroyuki Fudemoto, Kodaira (JP); Takashi Harada, Yokohama (JP); Tong Gao, Kodaira (JP); Atsuko Honjo, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 381 days.

(21) Appl. No.: 14/381,292

(22) PCT Filed: Feb. 28, 2013

(86) PCT No.: PCT/JP2013/055584
§ 371 (c)(1),
(2) Date: Aug. 27, 2014

(87) PCT Pub. No.: WO2013/129629
PCT Pub. Date: Sep. 6, 2013

(65) Prior Publication Data
US 2015/0114539 A1    Apr. 30, 2015

(30) Foreign Application Priority Data

Feb. 29, 2012 (JP) ................................ 2012-044644

(51) Int. Cl.
*B60C 9/02*     (2006.01)
*B60C 5/00*     (2006.01)
(Continued)

(52) U.S. Cl.
CPC .................. *B60C 9/18* (2013.01); *B60C 1/00* (2013.01); *B60C 5/007* (2013.01); *B60C 5/01* (2013.01);
(Continued)

(58) Field of Classification Search
CPC B60C 1/00; B60C 1/0041; B60C 5/00; B60C 5/01
See application file for complete search history.

(56) References Cited

U.S. PATENT DOCUMENTS 5,519,094 A * 5/1996 Tseng ..................... C08L 67/02
524/539
5,992,486 A * 11/1999 Katsuki ................. B60C 1/0008
152/510

(Continued)

FOREIGN PATENT DOCUMENTS

EP    2610071 A1    7/2013
EP    2610072 A1    7/2013
(Continued)

OTHER PUBLICATIONS

Machine translation of JP 2003-104008, 2003.*
(Continued)

*Primary Examiner* — Justin Fischer
(74) *Attorney, Agent, or Firm* — Sughrue Mion, PLLC

(57) ABSTRACT

A tire includes a circular tire frame body formed of a resin-containing material. The resin material has a sea-island structure including a sea phase constituted by a first resin material and an island phase constituted by a second resin material, and the island phase is harder than the sea phase.

2 Claims, 7 Drawing Sheets

(51) Int. Cl.
  *B60C 5/01* (2006.01)
  *B60C 9/18* (2006.01)
  *B60C 1/00* (2006.01)
  *C08L 77/00* (2006.01)
  *C08G 69/40* (2006.01)
  *C08L 77/12* (2006.01)

(52) U.S. Cl.
  CPC .............. *C08G 69/40* (2013.01); *C08L 77/00* (2013.01); *C08L 77/12* (2013.01); *B60C 2001/0066* (2013.01); *Y10T 152/1081* (2015.01)

(56) References Cited

U.S. PATENT DOCUMENTS

| | | |
|---|---|---|
| 6,462,129 B1 | 10/2002 | Bertin et al. |
| 8,809,455 B2 * | 8/2014 | Ellul .......................... B60C 1/00 525/133 |
| 2011/0297289 A1 * | 12/2011 | Kouno .............. B29D 30/1628 152/539 |

FOREIGN PATENT DOCUMENTS

| | | |
|---|---|---|
| EP | 2815894 A1 | 12/2014 |
| JP | 3-143701 A | 6/1991 |
| JP | 2000-336277 A | 12/2000 |
| JP | 2003-104006 A | 4/2003 |
| JP | 2003-104008 A | 4/2003 |
| JP | 2004-346137 A | 12/2004 |
| WO | WO 01/17800 * | 3/2001 |

OTHER PUBLICATIONS

Communication dated Oct. 7, 2015 from the European Patent Office in application No. 13754701.4.

International Search Report for PCT/JP2013/055584 dated May 21, 2013 [PCT/ISA/210].

Written Opinion for PCT/JP2013/055584 dated May 21, 2013 [PCT/ISA/237].

* cited by examiner

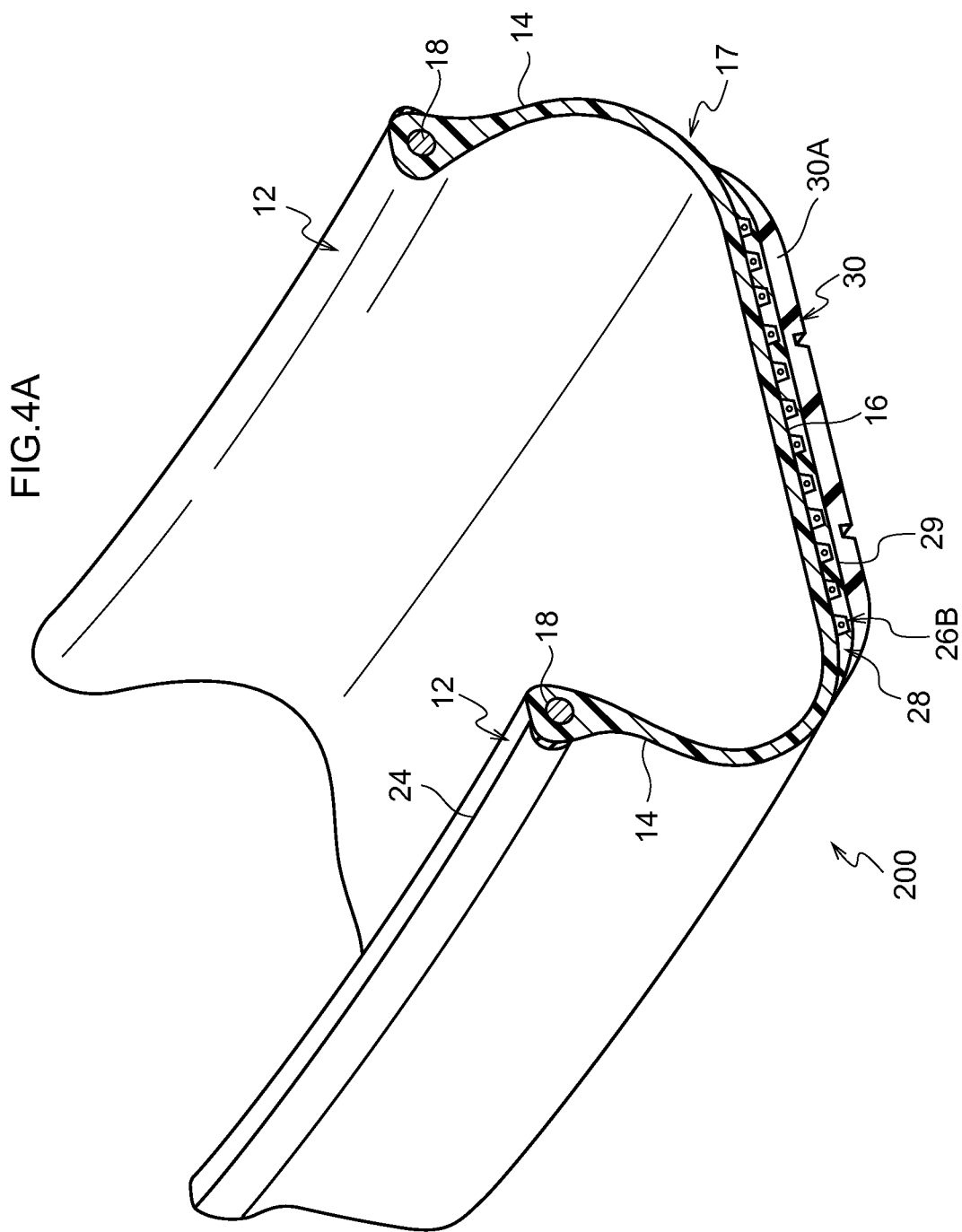

TIRE

CROSS REFERENCE TO RELATED APPLICATIONS

This application is a National Stage of International Application No. PCT/JP2013/055584, filed on Feb. 28, 2013, which claims priority from Japanese Patent Application No. 2012-044644, filed on Feb. 29, 2012, the contents of all of which are incorporated herein by reference in their entirety.

TECHNICAL FIELD

The present invention relates to a tire for fitting onto a rim, and in particular relates to a tire in which at least a portion is formed of a resin-containing material.

BACKGROUND ART

Pneumatic tires configured from rubber, organic fiber materials, steel members, and the like have hitherto been employed in vehicles such as cars.

Recently, the use of resin materials, in particular thermoplastic resins, thermoplastic elastomers, and the like, as tire materials is being investigated in consideration of light weight, ease of molding, and ease of recycling thereof.

For example, Japanese Patent Application Laid-Open (JP-A) No. 2003-104008 and JP-A No. H03-143701 disclose a pneumatic tire formed using a thermoplastic polymer material.

SUMMARY OF INVENTION

Technical Problem

Tires in which thermoplastic polymer materials are used are easier to manufacture and incur lower cost, as compared to conventional rubber-made tires. However, in cases in which tire frame bodies are formed with uniform thermoplastic polymer materials that do not incorporate reinforcement members such as a carcass ply, there is still room for improvement from viewpoints of the ability to withstand stress, the ability to withstand internal pressure, and the like, compared to conventional rubber-made tires.

In the case of manufacturing tires using thermoplastic polymer materials, it is requested that performance comparable to conventional rubber-made tires be achieved with an increased production efficiency at low cost.

In consideration of the circumstances described above, a tire having excellent heat resistance and formed using a resin material is desired.

Solution to Problem

The tire according to the present invention is a tire that includes a circular tire frame body formed of a resin-containing material, in which the resin material has a sea-island structure including a sea phase constituted by a first resin material and an island phase constituted by a second resin material, the island phase being harder than the sea phase.

Advantageous Effects of Invention

According to the invention, a tire having excellent heat resistance is provided.

BRIEF DESCRIPTION OF DRAWINGS

FIG. 4A is a cross-sectional view taken along the tire width direction of a tire according to an embodiment of the invention.

BEST MODE FOR CARRYING OUT THE INVENTION

Figure 1A:
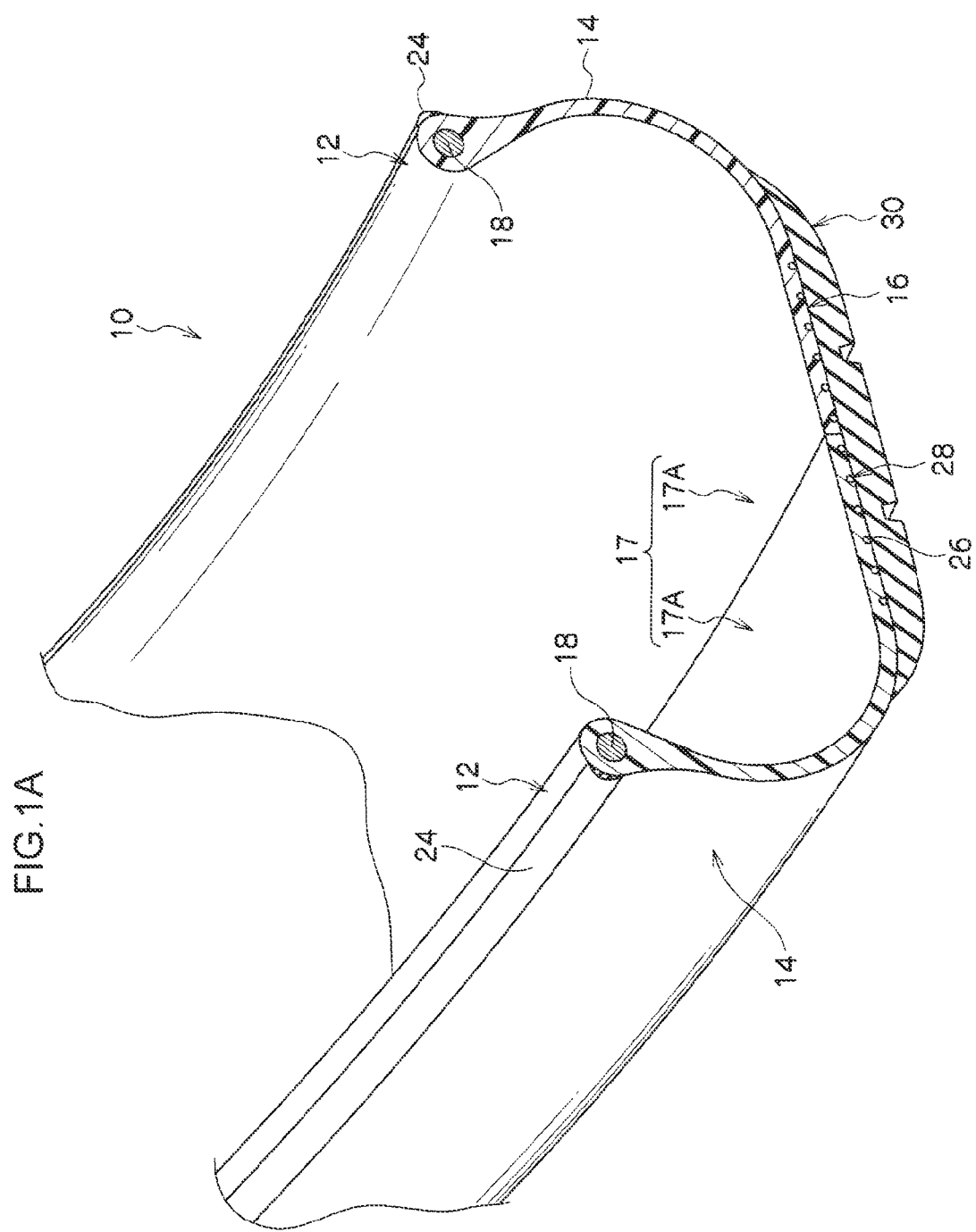
FIG. 1A is a perspective view illustrating a cross-section of a portion of a tire according to an embodiment of the invention.

As described above, a tire according to the invention is a tire that includes a circular tire frame body formed of a resin-containing material having a sea-island structure, the sea-island structure including a sea phase constituted by a first resin material and an island phase constituted by a second resin material, the island phase being harder than the sea phase.

In the invention, the "resin-containing material" means a material that includes at least a resin, and that may further include a component other than a resin; in a case in which the resin-containing material does not include a component other than a resin, the resin-containing material is constituted only of resin. In the following, the "resin-containing material" is also referred to as "resin material".

In the present specification, the scope of the term "resin" includes thermoplastic resins, thermosetting resins, and so-called engineering plastics, but does not include natural rubber. The scope of thermoplastic resins includes thermoplastic elastomers.

The "elastomer" means a resin formed of a copolymer including: a polymer constituting a hard segment that is crystalline and has a high melting point or a hard segment that has a high cohesive force; and a polymer constituting a soft segment that is amorphous and has a low glass transition temperature.

In the tire according to the invention, the resin material constituting the tire frame body has a sea-island structure including a sea phase constituted by a first resin material, and an island phase constituted by a second resin material and being harder than the sea phase. This configuration enables the tire according to the invention to have excellent heat resistance.

The excellent heat strength may be achieved by the following reasons. The presence of a material having higher elastic modulus in the resin material increases the strength of the resin material, compared to a resin material formed only from a soft material. In general, there is a tendency for resin materials having high elastic moduli to have high melting points, and the resin materials having high elastic moduli are not readily softened even when the resin material is exposed to high temperatures. As explained above, the inclusion of a sea phase constituted by the first resin material and an island phase constituted by the second resin material and being harder than the sea phase in the resin material constituting the tire frame body increases the strength of the resin material and making the resin material less liable to soften at high temperatures. This is thought to be the reason why the tire according to the invention has excellent heat resistance.

The heat resistance of the tire may be determined from, for example, the shear storage modulus G' of the resin material constituting the tire frame body. For example, the shear storage modulus G' (50° C.) at 50° C. and the shear storage modulus G' (0° C.) at 0° C. may be measured for resin materials, and the value of G' (50° C.)/G' (0° C.) may be computed for each resin material, in which case resin materials having lower G' (50° C.)/G' (0° C.) values than that of a reference resin material have excellent heat resistance.

In the invention, the island phase being harder than the sea phase means that the elastic modulus of the second resin material constituting the island phase is greater than the elastic modulus of the first resin material constituting the sea phase.

The above elastic modulus refers to a tensile elastic modulus determined according to JIS K7113:1995 (below in the present specification, unless otherwise stated, "elastic modulus" means tensile elastic modulus).

Moreover, due to forming the tire with a resin material, the need for a vulcanization process, which would be an essential process for conventional rubber-made tires, is obviated, and the tire frame body can be formed by, for example, injection molding. Moreover, using a resin material for the tire frame body enables the structure of a tire to be simplified compared to conventional rubber-made tires, and, as a result, enables a tire weight reduction to be achieved.

The resin material constituting the tire frame body according to the invention is described below, and then specific embodiments of tires according to the invention are described with reference to the drawings.

Resin Material

The resin material constituting the tire frame body includes a sea-island structure including a sea phase constituted by a first resin material and an island phase constituted by a second resin material, the island phase being harder than the sea phase.

The first resin material and the second resin material accordingly need to be phase separated into the sea phase (continuous phase) and the island phase (discontinuous phase), respectively, and the resin material constituting the tire frame body has a structure in which the island phase (the second resin material) is dispersed in the sea phase (the first resin material) as a matrix phase.

The island phase constituted by the second resin material being dispersed in the sea phase constituted by the first resin material may be confirmed by micrograph observation using a scanning electron microscope (SEM).

In the sea-island structure formed of the resin material, normally, there is a tendency that the resin material having a larger volume proportion in the resin materials forms the sea phase that is the continuous phase, and that the resin material having the smaller volume proportion in the resin materials forms the island phase that is the discontinuous phase. Consequently, in the invention, the ratio ($V_1/V_2$) of the volume of the first resin material constituting the sea phase ($V_1$) to the volume of the second resin material constituting the island phase ($V_2$) preferably exceeds 1. In the invention, normally, the ratio ($M_1/M_2$) of the content by mass of the first resin material constituting the sea phase ($M_1$) to the content by mass of the second resin material constituting the island phase ($M_2$) tends to exceed 1.

As already stated, the term "resin material" refers to a material that includes at least a resin, and that may further include a component other than a resin, and, in a case in which the resin material does not include a component other than a resin, the resin material is constituted only of resin. The scope of the term "resin" includes thermoplastic resins, thermosetting resins, and so-called engineering plastics (including super engineering plastics), but does not include natural rubber. The scope of "resin" includes elastomers. The term "elastomer" means a resin formed of a copolymer including: a polymer constituting a hard segment that is crystalline and has a high melting point or a hard segment that has a high cohesive force; and a polymer constituting a soft segment that is amorphous and has a low glass transition temperature.

Moreover, in the invention, the island phase constituted by the second resin material is harder than the sea phase constituted by the first resin material. This may be satisfied by the relationship in which the second resin material is harder than the first resin material.

As described above, in the invention, there are no particular limitations to the types of the first resin material and the second resin material as long as the relationship between first resin material and the second resin material is such that the first resin material and the second resin material form a sea-island structure, and such that the second resin material is harder than the first resin material.

For example, a configuration may be adopted in which a thermoplastic elastomer is used as the first resin material for constituting the sea phase, and in which a thermoplastic resin that is the polymer constituting a hard segment of the thermoplastic elastomer is used as the second resin material for constituting the island phase, the thermoplastic elastomer being a thermoplastic resin material formed of a copolymer including a polymer constituting a crystalline hard segment having a high melting point and a polymer constituting an amorphous soft segment having a low glass transition temperature. In another configuration, a resin material obtained by adding a plasticizer to a thermosetting resin is used as the first resin material for constituting the sea phase, and a thermosetting resin to which a plasticizer is not added is used as the second resin material for constituting the island phase.

For example, the first resin material may be configured to include at least one of: a first thermoplastic resin; or a first thermosetting resin and a plasticizer.

As stated above, constituting the tire frame body from a resin material enables the tire to be formed by a simple method, such as injection molding or press molding. Since thermosetting resins harden when heated, they generally tend to have higher elastic moduli than those of thermoplastic resins, which plasticize when heated. However, even in a case in which a thermosetting resin is used, the second resin material can be softened by including the thermosetting resin and a plasticizer in the resin material.

Consequently, the first resin material for constituting the sea phase that is softer than the island phase may be a thermoplastic resin (the scope of which includes a thermoplastic elastomer), or a material that is a combination of a thermoplastic resin and a plasticizer, or a combination of a thermoplastic resin (the scope of which includes a thermoplastic elastomer) a thermosetting resin, and a plasticizer.

The second resin material may include at least one of a second thermoplastic resin or a second thermosetting resin.

There are no particular limitations to the second resin material for constituting the island phase that is harder than the sea phase, and, in the case of a thermosetting resin, the thermosetting resin needs not be plasticized with a plasticizer. However, in a case in which preparation is performed such that the first resin material is softener than the second resin material through appropriate regulation of the type and the quantity of plasticizer to be added to a thermosetting resin, it is possible to use a resin material including a thermosetting resin and a plasticizer as the second resin material.

The first thermoplastic resin material is preferably at least one selected from the group consisting of a thermoplastic polyolefin-based elastomer, a thermoplastic polystyrene-based elastomer, a thermoplastic polyamide-based elastomer, a thermoplastic polyurethane-based elastomer, a thermoplastic polyester-based elastomer, and a dynamically crosslinked thermoplastic elastomer.

The first resin material for constituting the sea phase that is softer than the island phase, preferably includes a thermoplastic elastomer having excellent elasticity from among thermoplastic resins. In particular, at least one selected from the group consisting of a thermoplastic polyolefin-based elastomer, a thermoplastic polystyrene-based elastomer, a thermoplastic polyamide-based elastomer, a thermoplastic polyurethane-based elastomer, a thermoplastic polyester-based elastomer, and a dynamically crosslinked thermoplastic elastomer is preferably used in the first resin material.

In particular, a combination of a thermoplastic polyamide-based elastomer as the first resin material and a polyethylene resin or a polyphenylene ether as the second thermoplastic resin is preferable, and the polyethylene resin is more preferably a high density polyethylene resin. In such cases, the ratio of the amount of the first thermoplastic resin to the amount of the second resin material is preferably as follows: the ratio by mass of the first thermoplastic resin:second resin material is preferably in the range of from 60:40 to 90:10, and more preferably in the range of from 70:20 to 90:10.

From the viewpoint of raising the heat resistance of the tire, a combination in which the first resin material is a thermoplastic polyamide-based elastomer and the second resin material is a resin material having a tensile elastic modulus of 1000 MPa or greater is also preferable.

Moreover, the tensile elastic modulus γ1 of the first resin material and the content W1 of the first resin material in the entire resin-containing material, and the tensile elastic modulus γ2 of the second resin material and the content W2 of the second resin material in the entire resin-containing material, preferably satisfy the following Inequality (1).

$$0.25 \leq ((\gamma 1 \times W1)/(\gamma 2 \times W2)) \leq 2 \quad \text{Inequality (1)}$$

The coefficient expressed by $(\gamma 1 \times W1)/(\gamma 2 \times W2)$ is also called the elastic modulus coefficient. By selecting materials for the first resin material and the second resin material so as to have an elastic modulus coefficient within a range of from 0.25 to 2, and using the selected materials, a tire having more favorable heat resistance can be achieved.

The units for the tensile elastic modulus γ1 of the first resin material and the tensile elastic modulus γ2 of the second resin material are MPa, and the units of the content W1 of the first resin material in the entire resin-containing material and the content W2 of the second resin material in the entire resin-containing material are % by mass.

Resins that may be used in the first resin material and the second resin material, and components other than the resins, are described below.

Resin

Examples of the resins include thermoplastic resins (including thermoplastic elastomers), thermosetting resins, and other general use resins, as well as engineering plastics (including super engineering plastics). These are described below in sequence.

Thermoplastic Resins (Including Thermoplastic Elastomers)

Thermoplastic resins (including thermoplastic elastomers) are polymer compounds in which the material thereof softens and fluidizes with increasing temperature, and which takes a relatively hard and strong state on cooling.

In the present specification, among these, discrimination is made between thermoplastic elastomers and non-elastomer thermoplastic resins; a thermoplastic elastomer refers to a polymer compound in which the material thereof softens and fluidizes with increasing temperature, and which takes a relatively hard and strong state on cooling, and which have a rubber-like elasticity, and a non-elastomer thermoplastic resin refers to a polymer compound in which the material thereof softens and fluidizes with increasing temperature, and which takes a relatively hard and strong state on cooling, and which does not have a rubber-like elasticity.

Examples of thermoplastic resins (including thermoplastic elastomers) include thermoplastic polyolefin-based elastomers (TPO), thermoplastic polystyrene-based elastomers (TPS), thermoplastic polyamide-based elastomers (TPA), thermoplastic polyurethane-based elastomers (TPU), thermoplastic polyester-based elastomers (TPC), and dynamically crosslinked thermoplastic elastomers (TPV), as well as non-elastomer thermoplastic polyolefin-based resins, non-elastomer thermoplastic polystyrene-based resins, non-elastomer thermoplastic polyamide-based resins, and non-elastomer thermoplastic polyester-based resins.

Thermoplastic Polyolefin-Based Elastomer

Examples of the "thermoplastic polyolefin-based elastomer" include a material in which at least a polyolefin constitutes a crystalline hard segment having a high melting point, and in which another polymer (for example, the polyolefins mentioned above or another polyolefin) constitutes an amorphous soft segment having a low glass transition temperature. Examples of the polyolefin forming the hard segment include polyethylene, polypropylene, isotactic polypropylene, and polybutene.

The thermoplastic polyolefin-based elastomer is also simply referred to as "thermoplastic olefin elastomer" (TPO).

The thermoplastic polyolefin-based elastomer is not particularly limited, and examples thereof include copolymers in which a crystalline polyolefin constitutes a hard segment having a high melting point, and in which an amorphous polymer constitutes a soft segment having a low glass transition temperature.

Examples of the thermoplastic polyolefin-based elastomer include olefin-α-olefin random copolymers and olefin block copolymers. Examples thereof include a propylene block copolymer, a copolymer of ethylene and propylene, a copolymer of propylene and 1-hexene, a copolymer of propylene and 4-methyl-1-pentene, a copolymer of propylene and 1-butene, a copolymer of ethylene and 1-hexene, a copolymer of ethylene and 4-methylpentene, a copolymer of ethylene and 1-butene, a copolymer of 1-butene and 1-hexene, 1-butene-4-methyl-pentene, a copolymer of ethylene and methacrylic acid, a copolymer of ethylene and methyl methacrylate, a copolymer of ethylene and ethyl methacrylate, a copolymer of ethylene and butyl methacrylate, a copolymer of ethylene and methyl acrylate, a copolymer of ethylene and ethyl acrylate, a copolymer of ethylene and butyl acrylate, a copolymer of propylene and methacrylic acid, a copolymer of propylene and methyl methacrylate, a copolymer of propylene and ethyl methacrylate, a copolymer of propylene and butyl methacrylate, a copolymer of propylene and methyl acrylate, a copolymer of propylene and ethyl acrylate, a copolymer of propylene and butyl acrylate, a copolymer of ethylene and vinyl acetate, and a copolymer of propylene and vinyl acetate.

A propylene block copolymer, a copolymer of ethylene and propylene, a copolymer of propylene and 1-hexene, a copolymer of propylene and 4-methyl-1-pentene, a copolymer of propylene and 1-butene, a copolymer of ethylene and 1-hexene, a copolymer of ethylene and 4-methylpentene, a copolymer of ethylene and 1-butene, a copolymer of ethylene and methacrylic acid, a copolymer of ethylene and methyl methacrylate, a copolymer of ethylene and ethyl methacrylate, a copolymer of ethylene and butyl methacrylate, a copolymer of ethylene and methyl acrylate, a copolymer of ethylene and ethyl acrylate, a copolymer of ethylene and butyl acrylate, a copolymer of propylene and methacrylic acid, a copolymer of propylene and methyl methacrylate, a copolymer of propylene and ethyl methacrylate, a copolymer of propylene and butyl methacrylate, a copolymer of propylene and methyl acrylate, a copolymer of propylene and ethyl acrylate, a copolymer of propylene and butyl acrylate, a copolymer of ethylene and vinyl acetate, and a copolymer of propylene and vinyl acetate are preferable as the thermoplastic polyolefin-based elastomer, and a copolymer of ethylene and propylene, a copolymer of propylene and 1-butene, a copolymer of ethylene and 1-butene, a copolymer of ethylene and methyl methacrylate, a copolymer of ethylene and methyl acrylate, a copolymer of ethylene and ethyl acrylate, and a copolymer of ethylene and butyl acrylate are still more preferable.

Moreover, two or more polyolefin resins, such as ethylene and propylene, may be used in combination. Moreover, the polyolefin content ratio in the thermoplastic polyolefin-based elastomer is preferably from 50% by mass to 100% by mass.

The number average molecular weight of the thermoplastic polyolefin-based elastomer is preferably from 5,000 to 10,000,000. When the number average molecular weight of the thermoplastic polyolefin-based elastomer is from 5,000 to 10,000,000, the resin material has satisfactory mechanical properties and excellent workability. From similar viewpoints, the number average molecular weight of the thermoplastic polyolefin-based elastomer is more preferably from 7,000 to 1,000,000, and is particularly preferably from 10,000 to 1,000,000. A number average molecular weight of the thermoplastic polyolefin-based elastomer within such ranges enables further improvements to the mechanical properties and workability of the resin material. From the viewpoints of toughness and low temperature flexibility, the number average molecular weight of the polymer constituting the soft segment is preferably from 200 to 6000. From the viewpoint of formability, the mass ratio (x:y) of the hard segment (x) to the soft segment (y) is preferably from 50:50 to 95:5, and is still more preferably from 50:50 to 90:10.

A thermoplastic polyolefin-based elastomer can be synthesized by copolymerizing the polymer for forming the hard segment and the polymer for forming the soft segment, using a known method.

Acid-Modified Thermoplastic Olefin-Based Elastomer

An "acid-modified thermoplastic polyolefin-based elastomer" means a thermoplastic polyolefin-based elastomer obtained by acid modification through attachment of an unsaturated compound having an acid group such as a carboxylic acid group, a sulfuric acid group, or a phosphoric acid group to an unmodified thermoplastic polyolefin-based elastomer. The acid-modified thermoplastic polyolefin-based elastomer can be obtained by, for example, attaching (for example, graft-polymerizing) an unsaturated bond site of an unsaturated carboxylic acid or an unsaturated carboxylic acid anhydride to a thermoplastic polyolefin-based elastomer.

From the viewpoint of suppressing degradation of the thermoplastic elastomer, the (unsaturated) compound having an acid group is preferably a compound having a carboxylic acid group, which is a weak acid group, and examples thereof include acrylic acid, methacrylic acid, itaconic acid, crotonic acid, isocrotonic acid, and maleic acid.

Examples of materials that can be used as the thermoplastic polyolefin-based elastomer include commercial products such as: TAFMER series (for example, A0550S, A1050S, A4050S, A1070S, A4070S, A35070S, A1085S, A4085S, A7090, A70090, MH7007, MH7010, XM-7070, XM-7080, BL4000, BL2481, BL3110, BL3450, P-0275, P-0375, P-0775, P-0180, P-0280, P-0480, and P-0680) manufactured by Mitsui Chemicals, Inc.; NUCREL series (for example, AN4214C, AN4225C, AN42115C, N0903HC, N0908C, AN42012C, N410, N1050H, N1108C, N1110H, N1207C, N1214, AN4221C, N1525, N1560, N0200H, AN4228C, AN4213C, and N035C) and ELVALOY AC series (for example, 1125AC, 1209AC, 1218AC, 1609AC, 1820AC, 1913AC, 2112AC, 2116AC, 2615AC, 2715AC, 3117AC, 3427AC, and 3717AC) manufactured by Du Pont-Mitsui Polychemicals Co., Ltd.; ACRYFT series and EVATATE series manufactured by Sumitomo Chemical Co., Ltd.; and ULTRA-SEN series manufactured by Tosoh Corporation.

Further examples of materials that can be used as the thermoplastic polyolefin-based elastomer also include commercially available PRIME TPO series (examples include, E-2900H, F-3900H, E-2900, F-3900, J-5900, E-2910, F-3910, J-5910, E-2710, F-3710, J-5910, E-2740, F-3740, R110MP, R110E, T310E, and M142E) manufactured by Prime Polymer Co., Ltd.

Thermoplastic Polystyrene-Based Elastomer

Examples of the thermoplastic polystyrene-based elastomer include a material in which at least polystyrene constitutes the hard segment, and in which another polymer (for example, polybutadiene, polyisoprene, polyethylene, hydrogenated polybutadiene, or hydrogenated polyisoprene) constitutes the soft segment having a low glass transition temperature. Synthetic rubber, such as vulcanized SBR resin, may be used as the thermoplastic polystyrene-based elastomer.

The thermoplastic polystyrene-based elastomer is also referred to as "thermoplastic styrene elastomer" (TPS).

Either an acid-modified thermoplastic polystyrene-based elastomer modified with an acid group or an unmodified thermoplastic polystyrene-based elastomer may be used as the thermoplastic polystyrene-based elastomer.

A polystyrene obtained using a known radical polymerization method or an ionic polymerization method can suitably be used as a polystyrene for forming the hard segment, and an example thereof is a polystyrene having an anionic living polymerization. Examples of a polymer for forming the soft segment include polybutadiene, polyisoprene, and poly(2,3-dimethyl-butadiene). The acid-modified thermoplastic polystyrene-based elastomer can be obtained by acid-modifying an unmodified thermoplastic polystyrene-based elastomer, as described below.

The combination of the hard segment and the soft segment may be a combination of a hard segment selected from those described above and a soft segment selected from those described above. Of these, a combination of polystyrene and polybutadiene, and a combination of polystyrene and polyisoprene, are preferable. Moreover, in order to suppress unintended crosslinking reactions of the thermoplastic elastomer, the soft segment is preferably hydrogenated.

The number average molecular weight of the polymer (polystyrene) constituting the hard segment is preferably from 5000 to 500000, and preferably from 10000 to 200000.

Moreover, the number average molecular weight of the polymer constituting the soft segment is preferably from 5000 to 1000000, more preferably from 10000 to 800000, and particularly preferably from 30000 to 500000. Moreover, from the viewpoint of formability, the volume ratio (x:y) of the hard segment (x) to the soft segment (y) is preferably from 5:95 to 80:20, and still more preferably from 10:90 to 70:30.

The thermoplastic polystyrene-based elastomer can be synthesized by copolymerizing the polymer for forming the hard segment and the polymer for forming the soft segment, using a known method.

Examples of the thermoplastic polystyrene-based elastomer include styrene-butadiene-based copolymers [SBS (polystyrene-poly(butylene)block-polystyrene), and SEBS (polystyrene-poly(ethylene/butylene)block-polystyrene)], styrene-isoprene copolymers [polystyrene-polyisoprene block-polystyrene)], and styrene-propylene-based copolymers [SEP (polystyrene-(ethylene/propylene)block), SEPS (polystyrene-poly(ethylene/propylene)block-polystyrene), SEEPS (polystyrene-poly(ethylene-ethylene/propylene)block-polystyrene)], and SEB (polystyrene (ethylene/butylene)block); SEBS is particularly preferable.

Examples of materials that can be used as the unmodified thermoplastic polystyrene-based elastomer include TUFTEC series (for example, H1031, H1041, H1043, H1051, H1052, H1053, H1062, H1082, H1141, H1221, and H1272) manufactured by Asahi Kasei Corporation, and SEBS (such as HYBRAR 5127 and 5125) and SEPS (such as SEPTON 2002, 2063, S2004, and S2006) manufactured by Kuraray Co., Ltd., which are commercial products.

Acid-Modified Thermoplastic Polystyrene-Based Elastomer

"Acid-modified thermoplastic polystyrene-based elastomer" refers to a thermoplastic polystyrene-based elastomer obtained by acid modification through attachment of an unsaturated compound having an acid group such as a carboxylic acid group, a sulfuric acid group, or a phosphoric acid group to an unmodified thermoplastic polystyrene-based elastomer. The acid-modified thermoplastic polystyrene-based elastomer can be obtained by, for example, attaching (for example, graft-polymerizing) an unsaturated bond site of an unsaturated carboxylic acid or an unsaturated carboxylic acid anhydride to a thermoplastic polystyrene-based elastomer.

From the viewpoint of suppressing degradation of the thermoplastic elastomer, the (unsaturated) compound having an acid group is preferably a compound having a carboxylic acid group, which is a weakly acidic group. Examples thereof include acrylic acid, methacrylic acid, itaconic acid, crotonic acid, isocrotonic acid, and maleic acid.

Examples of the acid-modified thermoplastic polystyrene-based elastomer include TUFTEC, such as M1943, M1911, or M1913 manufactured by Asahi Kasei Corporation, and FG19181G manufactured by Kraton Inc.

The acid value of the acid-modified thermoplastic polystyrene-based elastomer is preferably from more than 0 mg $(CH_3ONa)/g$ to 20 mg $(CH_3ONa)/g$, more preferably from more than 0 mg $(CH_3ONa)/g$ to 17 mg $(CH_3ONa)/g$, and particularly preferably from more than 0 mg $(CH_3ONa)/g$ to 15 mg $(CH_3ONa)/g$.

Thermoplastic Polyamide-Based Elastomer

In the invention, "thermoplastic polyamide-based elastomer" refers to a thermoplastic resin material that is formed of a copolymer, the copolymer including a polymer constituting a crystalline hard segment having a high melting point and a polymer constituting an amorphous soft segment having a low glass transition temperature, and the polymer constituting the hard segment having an amide bond (—CONH—) in the main chain thereof.

The thermoplastic polyamide-based elastomer is also simply referred to as "thermoplastic amid elastomer" (TPA).

The thermoplastic polyamide-based elastomer may be, for example, a material in which at least a polyamide constitutes a crystalline hard segment having a high melting point, and in which another polymer (such as a polyester or a polyether) constitutes an amorphous soft segment having a low glass transition temperature. In the thermoplastic polyamide-based elastomer, a chain extender, such as a dicarboxylic acid, may also be used in addition to the hard segment and the soft segment. A polyamide for forming the hard segment may be, for example, a polyamide generated from a monomer represented by the following Formula (1) or Formula (2).

$$H_2N—R^1—COOH \quad \text{Formula (1)}$$

In Formula (1), $R^1$ represents a hydrocarbon molecular chain having from 2 to 20 carbon atoms, or an alkylene group having from 2 to 20 carbon atoms.

Formula (2)

In Formula (2), $R^2$ represents a hydrocarbon molecular chain having from 3 to 20 carbon atoms, or an alkylene group having from 3 to 20 carbon atoms.

$R^1$ in Formula (1) is preferably a hydrocarbon molecular chain having from 3 to 18 carbon atoms, or an alkylene group having from 3 to 18 carbon atoms, more preferably a hydrocarbon molecular chain having from 4 to 15 carbon atoms, or an alkylene group having from 4 to 15 carbon atoms, and particularly preferably a hydrocarbon molecular chain having from 10 to 15 carbon atoms, or an alkylene group having from 10 to 15 carbon atoms. Moreover, $R^2$ in Formula (2) is preferably a hydrocarbon molecular chain having from 3 to 18 carbon atoms, or an alkylene group having from 3 to 18 carbon atoms, more preferably a hydrocarbon molecular chain having from 4 to 15 carbon atoms, or an alkylene group having from 4 to 15 carbon atoms, and is particularly preferably a hydrocarbon molecular chain having from 10 to 15 carbon atoms, or an alkylene group having from 10 to 15 carbon atoms.

Examples of the monomer represented by Formula (1) or Formula (2) include ω-aminocarboxylic acids and lactams.

Moreover, examples of a polyamide for forming the hard segment include a polycondensate of such a ω-aminocarboxylic acid or a lactam, and a co-condensation polymer of a diamine and a dicarboxylic acid.

Examples of the ω-aminocarboxylic acid include aliphatic ω-aminocarboxylic acids having from 5 to 20 carbon atoms, such as 6-aminocaproic acid, 7-aminoheptanoic acid, 8-aminooctanoic acid, 10-aminocapric acid, 11-aminoundecanoic acid, and 12-aminododecanoic acid. Examples of the lactam include aliphatic lactams having from 5 to 20 carbon atoms, such as lauryl lactam, ε-caprolactam, undecane lactam, ω-enantholactam, and 2-pyrrolidone.

Examples of the diamine include diamine compounds such as aliphatic diamines having from 2 to 20 carbon atoms such as ethylene diamine, trimethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethylhexamethylene diamine, 3-methylpentamethylene diamine, and metaxylenediamine. The dicarboxylic acid may be represented by HOOC—$(R^3)$m-COOH in which $R^3$ represents a hydrocarbon molecular chain having from 3 to 20 carbon atoms, and m represents 0 or 1, and examples thereof include aliphatic dicarboxylic acids having from 2 to 20 carbon atoms such as oxalic acid, succinic acid, glutaric acid, adipic acid, pimelic acid, suberic acid, azelaic acid, sebacic acid, and dodecanedioic acid.

A polyamide that can suitably be used for forming the hard segment is a polyamide formed by ring-opening polycondensation of lauryl lactam, ε-caprolactam or undecane lactam.

Examples of the polymer for forming the soft segment include polyesters and polyethers, and examples thereof include polyethylene glycol, polypropylene glycol, polytetramethylene ether glycol, and ABA-type triblock polyethers. These may be used singly, or in combination of two or more thereof. Moreover, a polyether diamine or the like obtained by allowing ammonia or the like to react with a terminal of a polyether may be used.

Herein, "ABA-type triblock polyether" indicates a polyether represented by Formula (3) below.

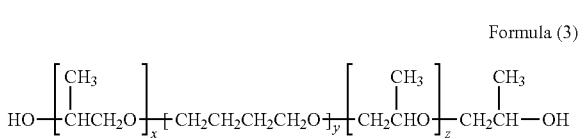

Formula (3)

In Formula (3), x and z represent integers from 1 to 20, and y represents an integer from 4 to 50.

In Formula (3), each of x and z is preferably an integer from 1 to 18, more preferably an integer from 1 to 16, particularly preferably an integer from 1 to 14, and most preferably an integer from 1 to 12. Moreover, y in Formula (3) is preferably an integer from 5 to 45, more preferably an integer from 6 to 40, particularly preferably an integer from 7 to 35, and most preferably an integer from 8 to 30.

The combination of the hard segment and the soft segment may be a combination of a hard segment selected from those described above and a soft segment selected from those described above. Among these, a combination of a ring-opened polycondensate of lauryl lactam and polyethylene glycol, a combination of a ring-opened polycondensate of lauryl lactam and polypropylene glycol, a combination of a ring-opened polycondensate of lauryl lactam and polytetramethylene ether glycol, and a combination of a ring-opened polycondensate of lauryl lactam and an ABA-type triblock polyether are preferable. A combination of a ring-opened polycondensate of lauryl lactam and an ABA-type triblock polyether is particularly preferable.

From the viewpoint of melt-formability, the number average molecular weight of the polymer (polyamide) constituting the hard segment is preferably from 300 to 30000. From the viewpoints of toughness and low temperature flexibility, the number average molecular weight of the polymer constituting the soft segment is preferably from 200 to 20000. From the viewpoint of formability, the mass ratio (x:y) of the hard segment (x) to the soft segment (y) is preferably from 50:50 to 90:10, and is more preferably from 50:50 to 80:20.

The thermoplastic polyamide-based elastomer can be synthesized by copolymerizing the polymer for forming the hard segment and the polymer for forming the soft segment, using a known method.

Examples of materials that can be used as the thermoplastic polyamide-based elastomer include UBESTA XPA series (for example, XPA9063X1, XPA9055X1, XPA9048X2, XPA9048X1, XPA9040X1, XPA9040X2, and XPA9044) manufactured by Ube Industries, Ltd., and VESTAMID series (for example, E40-S3, E47-S1, E47-S3, E55-S1, E55-S3, EX9200, and E50-R2) manufactured by Daicel-Evonik Ltd., which are commercial products.

Thermoplastic Polyurethane-Based Elastomer

Examples of the thermoplastic polyurethane-based elastomer include a material in which at least a polyurethane constitutes a hard segment having pseudo-crosslinks formed by physical aggregation, and in which another polymer constitutes an amorphous soft segment having a low glass transition temperature.

The thermoplastic polyurethane-based elastomer is also referred to as simply "thermoplastic urethan elastomer" (TPU).

The thermoplastic polyurethane-based elastomer may specifically be expressed as, for example, a copolymer that includes a soft segment including a unit structure represented by the following Structural Unit (U-1) and a hard segment including a unit structure represented by the following Structural Unit (U-2).

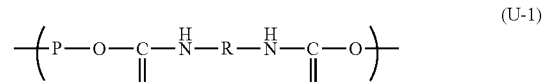

(U-1)

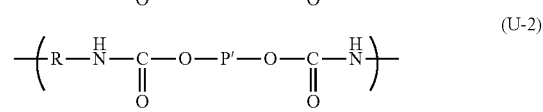

(U-2)

In the Structural Unit (U-1) and the Structural Unit (U-2), P represents a long-chain aliphatic polyether or a long-chain aliphatic polyester; R represents an aliphatic hydrocarbon, an alicyclic hydrocarbon, or an aromatic hydrocarbon; P' represents a short-chain aliphatic hydrocarbon, an alicyclic hydrocarbon, or an aromatic hydrocarbon.

In the Structural Unit (U-1), the long-chain aliphatic polyether or the long-chain aliphatic polyester represented by P may have a molecular weight of, for example, from 500 to 5000. The long-chain aliphatic polyether or long-chain aliphatic polyester represented by P is derived from a diol compound that includes the long-chain aliphatic polyether or long-chain aliphatic polyester represented by the P.

Examples of such a diol compound include polyethylene glycols, polypropylene glycols, polytetramethylene ether glycols, poly(butylene adipate) diols, poly-ε-caprolactone diols, poly(hexamethylene carbonate) diols, and ABA-type triblock polyethers (polyethers represented by Formula (3) above), each of which has a molecular weight within the range described above.

These compounds may be used singly, or in combination of two or more thereof.

In Structural Unit (U-1) and Structural Unit (U-2), the aliphatic hydrocarbon, an alicyclic hydrocarbon, or an aromatic hydrocarbon represented by R is derived from a diisocyanate compound that includes the aliphatic hydrocarbon, alicyclic hydrocarbon, or aromatic hydrocarbon represented by R. Examples of the aliphatic diisocyanate compound that includes the aliphatic hydrocarbon represented by R include 1,2-ethylene diisocyanate, 1,3-propylene diisocyanate, 1,4-butane diisocyanate, and 1,6-hexamethylene diisocyanate. Moreover, examples of the diisocyanate compound that includes the alicyclic hydrocarbon represented by R include 1,4-cyclohexane diisocyanate and 4,4-cyclohexane diisocyanate. Moreover, examples of the aromatic diisocyanate compound that includes the aromatic hydrocarbon represented by R include 4,4'-diphenylmethane diisocyanate and tolylene diisocyanate.

These compounds may be used singly, or in combination of two or more thereof.

In the Structural Unit (U-2), the short-chain aliphatic hydrocarbon, alicyclic hydrocarbon, or aromatic hydrocarbon represented by P' may have a molecular weight of, for example, less than 500. Moreover, the short-chain aliphatic hydrocarbon, alicyclic hydrocarbon, or aromatic hydrocarbon represented by P' is derived from a diol compound that includes the short-chain aliphatic hydrocarbon, alicyclic hydrocarbon, or aromatic hydrocarbon represented by P'. Examples of the aliphatic diol compound that includes the short-chain aliphatic hydrocarbon represented by P' include glycols and polyalkylene glycols, and examples thereof include ethylene glycol, propylene glycol, trimethylene glycol, 1,4-butanediol, 1,3-butanediol, 1,5-pentanediol, 1,6-hexanediol, 1,7-heptanediol, 1,8-octanediol, 1,9-nonanediol, and 1,10-decanediol.

Moreover, examples of the alicyclic diol compound that includes the alicyclic hydrocarbon represented by P' include cyclopentane-1,2-diol, cyclohexane-1,2-diol, cyclohexane-1,3-diol, cyclohexane-1,4-diol, and cyclohexane-1,4-dimethanol.

Furthermore, examples of the aromatic diol compound that includes the aromatic hydrocarbon represented by P' include hydroquinone, resorcinol, chlorohydroquinone, bromohydroquinone, methylhydroquinone, phenylhydroquinone, methoxyhydroquinone, phenoxyhydroquinone, 4,4'-dihydroxybiphenyl, 4,4'-dihydroxydiphenylether, 4,4'-dihydroxydiphenylsulfide, 4,4'-dihydroxydiphenylsulfone, 4,4'-dihydroxybenzophenone, 4,4'-dihydroxydiphenylmethane, bisphenol A, 1,1-di(4-hydroxyphenyl)cyclohexane, 1,2-bis(4-hydroxyphenoxy)ethane, 1,4-dihydroxynaphthalene, and 2,6-dihydroxynaphthalene.

These compounds may be used singly, or in combination of two or more thereof.

From the viewpoint of melting and formability, the number average molecular weight of the polymer (polyurethane) constituting the hard segment is preferably from 300 to 1500. Moreover, from the viewpoints of flexibility and thermal stability of the thermoplastic polyurethane-based elastomer, the number average molecular weight of the polymer constituting the soft segment is preferably from 500 to 20000, more preferably from 500 to 5000, and particularly preferably from 500 to 3000. Moreover, from the viewpoint of formability, the mass ratio (x:y) of the hard segment (x) to the soft segment (y) is preferably from 15:85 to 90:10, and more preferably from 30:70 to 90:10.

The thermoplastic polyurethane-based elastomer can be synthesized by copolymerizing the polymer for forming the hard segment and the polymer for forming the soft segment, using a known method. An example of the thermoplastic polyurethane-based elastomer that can be used is the thermoplastic polyurethane described in JP-A H05-331256.

Specifically, the thermoplastic polyurethane-based elastomer is preferably a combination of a hard segment formed from an aromatic diol and an aromatic diisocyanate and a soft segment formed from a polycarbonate ester; a tolylene diisocyanate (TDI)/polyester-based polyol copolymer, a TDI/polyether-based polyol copolymer, a TDI/caprolactone-based polyol copolymer, a TDI/polycarbonate-based polyol copolymer, a 4,4'-diphenylmethane diisocyanate (MDI)/polyester-based polyol copolymer, an MDI/polyether-based polyol copolymer, an MDI/caprolactone-based polyol copolymer, an MDI/polycarbonate-based polyol copolymer, or an MDI+hydroquinone/polyhexamethylene carbonate copolymer are preferable, and a TDI/polyester-based polyol copolymer, a TDI/polyether-based polyol copolymer, an MDI/polyester polyol copolymer, an MDI/polyether-based polyol copolymer, and an MDI+hydroquinone/polyhexamethylene carbonate copolymer are more preferable.

Moreover, examples of materials that can be used as the thermoplastic polyurethane-based elastomer include ELASTOLLAN series (for example, ET680, ET880, ET690, and ET890) manufactured by BASF SE, KURAMIRON U series (for example, 2000 series, 3000 series, 8000 series, and 9000 series) manufactured by Kuraray Co., Ltd., and MIRACTRAN series (for example, XN-2001, XN-2004, P390RSUP, P480RSUI, P26MRNAT, E490, E590, and P890) manufactured by Nippon Miractran Co., Ltd., which are commercial products.

Thermoplastic Polyester-Based Elastomer

The thermoplastic polyester-based elastomer may be, for example, a material in which at least a polyester constitutes a crystalline hard segment having a high melting point, and in which another polymer (such as a polyester or a polyether) constitutes an amorphous soft segment having a low glass transition temperature.

The thermoplastic polyester-based elastomer is also referred to as "thermoplastic polyester elastomer" (TPC).

The polyester to be used for forming the hard segment may be an aromatic polyester. The aromatic polyester may be formed from, for example, an aromatic dicarboxylic acid or an ester-forming derivative thereof, and an aliphatic diol. The aromatic polyester is preferably polybutylene terephthalate derived from terephthalic acid and/or dimethyl terephthalate, and 1,4-butanediol. Moreover, the aromatic polyester may be a polyester derived from a dicarboxylic acid component such as isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, 5-sulfoisophthalic acid, or an ester-forming derivative thereof, and a diol having a molecular weight of 300 or less, examples of which include aliphatic diols such as ethylene glycol, trimethylene glycol, pentamethylene glycol, hexamethylene glycol, neopentyl glycol, and decamethylene glycol, alicyclic diols such as 1,4-cyclohexane dimethanol and tricyclodecane dimethylol, and aromatic diols such as xylylene glycol, bis(p-hydroxy)diphenyl, bis(p-hydroxyphenyl)propane, 2,2-bis[4-(2-hydroxyethoxyl)phenyl]propane, bis[4-(2-hydroxyl)phenyl] sulfone, 1,1-bis[4-(2-hydroxyethoxyl)phenyl]cyclohexane, 4,4'-dihydroxy-p-terphenyl, and 4,4'-dihydroxy-p-quaterphenyl. Moreover, the aromatic polyester may be a copolymer polyester formed using together two or more of the above dicarboxylic acid components and/or two or more of the above diol components. A polyfunctional carboxylic acid component, a polyfunctional oxyacid component, a polyfunctional hydroxy component, or the like, each of which is tri-functional or higher-functional, may be included in the copolymerization in a range of 5% by mol or less.

Examples of the polyester for forming the hard segment include polyethylene terephthalate, polybutylene terephthalate, polymethylene terephthalate, polyethylene naphthalate, and polybutylene naphthalate; polybutylene terephthalate is preferable.

Examples of the polymer for forming the soft segment include aliphatic polyesters and aliphatic polyethers.

Examples of the aliphatic polyether include poly(ethylene oxide)glycol, poly(propylene oxide)glycol, poly(tetramethylene oxide)glycol, poly(hexamethylene oxide)glycol, a copolymer of ethylene oxide and propylene oxide, a polymer formed by adding ethylene oxide to poly(propylene oxide)glycol, and a copolymer of ethylene oxide and tetrahydrofuran.

Examples of the aliphatic polyester include poly($\epsilon$-caprolactone), polyenantholactone, polycaprylolactone, polybutylene adipate, and polyethylene adipate.

Of these aliphatic polyethers and aliphatic polyesters, poly(tetramethylene oxide)glycol, a polymer formed by adding ethylene oxide to poly(propylene oxide)glycol, poly ($\epsilon$-caprolactone), polybutylene adipate, polyethylene adipate, and the like are preferable from the viewpoint of the elasticity characteristics of the polyester block copolymer obtained.

Moreover, from the viewpoints of toughness and flexibility at low temperature, the number average molecular weight of the polymer constituting the soft segment is preferably from 300 to 6000. Moreover, from the viewpoint of formability, the mass ratio (x:y) of the hard segment (x) to the soft segment (y) is preferably from 99:1 to 20:80, and still more preferably from 98:2 to 30:70.

The combination of the hard segment and the soft segment may be a combination of a hard segment selected from those described above and a soft segment selected from those described above. Of these, a combination in which the hard segment is polybutylene terephthalate, and in which the soft segment is an aliphatic polyether is preferable, and a combination in which the hard segment is polybutylene terephthalate, and in which the soft segment is poly(ethylene oxide)glycol is still more preferable.

Examples of materials that can be used as the thermoplastic polyester-based elastomer include HYTREL series (such as, for example, 3046, 5557, 6347, 4047, and 4767) manufactured by Du Pont-Toray Co., Ltd., and PELPRENE series (such as P30B, P40B, P40H, P55B, P70B, P150B, P280B, P450B, P150M, S1001, S2001, S5001, S6001, and S9001) manufactured by Toyobo Co., Ltd., which are commercial products.

The thermoplastic elastomer can be synthesized by copolymerizing the polymer for forming the hard segment and the polymer for forming the soft segment, using a known method.

Various non-elastomer thermoplastic resins are described below.

Non-Elastomer Thermoplastic Polyolefin-Based Resin

A non-elastomer polyolefin-based resin is a polyolefin-based resin having a higher elastic modulus than that of the thermoplastic polyolefin-based elastomer described above.

Examples of the non-elastomer thermoplastic polyolefin-based resin include homopolymers, random copolymers, and block copolymers of an $\alpha$-olefin such as propylene or ethylene or a cyclic olefin such as a cycloolefin. Specific examples thereof include thermoplastic polyethylene-based resins, thermoplastic polypropylene-based resins, and thermoplastic polybutadiene-based resins; thermoplastic polypropylene-based resins are particularly preferable from the viewpoints of heat resistance and workability.

Specific examples of the non-elastomer thermoplastic polypropylene-based resin include a propylene homopolymer, a random copolymer of propylene and $\alpha$-olefin, and a block copolymer of propylene and $\alpha$-olefin. Examples of the $\alpha$-olefin include $\alpha$-olefins having approximately from 3 to 20 carbon atoms, such as propylene, 1-butene, 1-pentene, 3-methyl-1-butene, 1-hexene, 4-methyl-1-pentene, 3-methyl-1-pentene, 1-heptene, 1-octene, 1-decene, 1-dodecene, 1-tetradecene, 1-hexadecene, 1-octadecene, and 1-eicosene.

The thermoplastic polyolefin-based resin may be a chlorinated polyolefin-based resin in which some or all of the hydrogen atoms in the molecule thereof have been replaced by chlorine atoms. Examples of the chlorinated polyolefin-based resin include chlorinated polyethylene-based resins.

Non-Elastomer Thermoplastic Polystyrene-Based Resin

The non-elastomer thermoplastic polystyrene-based resin is a thermoplastic polystyrene-based resin having a higher elastic modulus than that of the thermoplastic polystyrene-based elastomer described above.

Materials that can suitably be used as the non-elastomer thermoplastic polystyrene-based resin include a non-elastomer thermoplastic polystyrene-based resin obtained by, for example, a known radical polymerization method or ionic polymerization method, and examples thereof include a polystyrene having an anionic living polymerization. Moreover, examples of the thermoplastic polystyrene-based resin include a polymer that includes a styrene molecular skeleton and a copolymer of styrene and acrylonitrile.

Of these, a copolymer of acrylonitrile, butadiene, and styrene, a hydrogenated product thereof, a blend of polybutadiene and a copolymer of acrylonitrile and styrene, and a hydrogenated product thereof, are preferable. Specific examples of the thermoplastic polystyrene-based resin include polystyrenes (known as PS resins), acrylonitrile-styrene resins (known as AS resins), acrylic-styrene-acrylonitrile resins (known as ASA resins), acrylonitrile-butadiene-styrene resins (known as ABS resins (including blend-forms and copolymer-forms)), hydrogenated products of ABS resins (known as AES resins), and acrylonitrile-chlorinated polyethylene-styrene copolymers (known as ACS resins).

As stated above, an AS resin is an acrylonitrile-styrene resin, and is a copolymer in which styrene and acrylonitrile are main components; in the As resin, an aromatic vinyl compound such as $\alpha$-methylstyrene, vinyltoluene, or divinylbenzene, a cyanated vinyl compound such as dimethacrylonitrile, an alkylester of (meth)acrylic acid such as methyl methacrylate, ethyl methacrylate, n-butyl methacrylate, methyl acrylate, ethyl acrylate, n-butyl acrylate, or stearyl acrylate, a maleimide-based monomer such as maleimide, N-methylmaleimide, N-ethylmaleimide, N-phenylmaleimide, or N-cyclohexylmaleimide, a diene compound, a dialkylester of maleic acid, an allyl alkyl ether, an unsaturated amino compound, a vinyl alkyl ether, or the like may be further copolymerized.

Further, in regard to the AS resin, it is preferable that an unsaturated monocarboxylic acid, an unsaturated dicarboxylic acid, an unsaturated acid anhydride, or a vinyl-based monomer containing an epoxy group has been graft-polymerized on the AS resin, or that an unsaturated monocarboxylic acid, an unsaturated dicarboxylic acid, an unsaturated acid anhydride, or a vinyl-based monomer containing an epoxy group is copolymerized in the AS resin. It is more preferable that an unsaturated acid anhydride or a vinyl-based monomer containing an epoxy group is graft-polymerized on the AS resin, or that an unsaturated acid anhydride or a vinyl-based monomer containing an epoxy group is copolymerized in the AS resin.

The vinyl-based monomer containing an epoxy group is a compound having both a radically polymerizable vinyl group and an epoxy group in a molecule thereof. Specific examples thereof include a glycidyl ester of an unsaturated organic acid such as glycidyl acrylate, glycidyl methacrylate, glycidyl ethacrylate, or glycidyl itaconate, a glycidyl ether such as allyl glycidyl ether, and derivatives of these such as 2-methylglycidyl methacrylate. Of these, glycidyl acrylate and glycidyl methacrylate are preferable for use. These compounds may be used singly, or in combination of two or more thereof.

Moreover, an unsaturated acid anhydride is a compound having both a radically polymerizable vinyl group and an acid anhydride in a molecule thereof. Preferable specific examples thereof include maleic acid anhydride.

An ASA resin is a substance that includes an acrylate monomer, a styrene monomer, and an acrylonitrile monomer. The ASA resin has rubbery properties and thermoplastic properties.

The ABS resin may be, for example, a resins produced by graft-polymerizing an olefin-based rubber (such as polybutadiene rubber) on an acrylonitrile-styrene-based resin to a degree of approximately 40% by mass or less. Moreover, the AES resin may be, for example, a resin produced by graft-polymerizing an ethylene-propylene copolymer rubber (such as EP rubber) on an acrylonitrile-styrene-based resin to a degree of approximately 40% by mass or less.

Non-Elastomer Thermoplastic Polyamide-Based Resin

The non-elastomer polyamide-based resin is a polyamide-based resin having a higher elastic modulus than the thermoplastic polyamide-based elastomer described above.

Examples of the non-elastomer thermoplastic polyamide-based resin include the above-described polyamides for constituting the hard segment of the thermoplastic polyamide-based elastomer. Examples of the thermoplastic polyamide-based resin include: a polyamide (amide 6) obtained by ring-opening polycondensation of ε-caprolactam; a polyamide (amide 11) obtained by ring-opening polycondensation of undecane lactam; a polyamide (amide 12) obtained by ring-opening polycondensation of lauryl lactam; a polyamide (amide 66) obtained by polycondensation of a diamine and a dibasic acid; and a polyamide (amide MX) having meta-xylene diamine as a structural unit.

The amide 6 may be represented by, for example, $\{CO-(CH_2)_5-NH\}_n$ (where n represents the number of repeating units).

The amide 11 may be represented by, for example, $\{CO-(CH_2)_{10}-NH\}_n$ (where n represents the number of repeating units).

The amide 12 may be represented by, for example, $\{CO-(CH_2)_{11}-NH\}_n$ (where n represents the number of repeating units).

The amide 66 may be represented by, for example, $\{CO(CH_2)_4CONH(CH_2)_6NH\}_n$ (where n represents the number of repeating units).

Moreover, the amide MX having meta-xylene diamine as a structural unit may be represented by, for example, the structural unit (A-1) below (where n in (A-1) represents the number of repeating units).

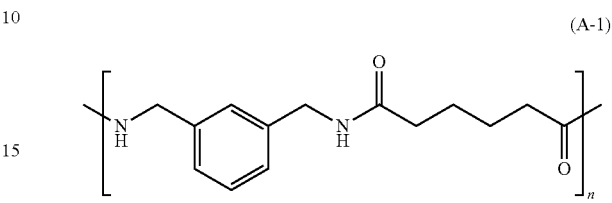

(A-1)

The non-elastomer thermoplastic polyamide-based resin may be a homopolymer configured by only the above structural unit, or a copolymer of the structural unit (A-1) and another monomer. In the case of a copolymer, the content ratio of the structural unit (A-1) in each thermoplastic polyamide-based resin is preferably 60% by mass or higher.

The number average molecular weight of the non-elastomer thermoplastic polyamide-based resin is preferably from 300 to 30000. Moreover, from the viewpoint of toughness and flexibility at low temperature, the number average molecular weight of the polymer constituting the soft segment is preferably from 200 to 20000.

A commercial product may be used as the non-elastomer polyamide-based resin.

Examples of materials that can be used as the amide 6 include UBE Nylon 1022B and 1011FB manufactured by Ube Industries, Ltd., which are commercial products.

Examples of materials that can be used as the amide 12 include UBE Nylons, such as 3024U, manufactured by Ube Industries, Ltd. Examples of materials that can be used as the amide 66 include UBE Nylons, such as 2020B. Moreover, examples of materials that can be used as the amide MX include MX Nylons (S6001, S6021, or S6011) manufactured by Mitsubishi Gas Chemical Company, Inc., which are commercial products.

Non-Elastomer Thermoplastic Polyester-Based Resin

The non-elastomer polyester-based resin is a resin that has a higher elastic modulus than that of the thermoplastic polyester-based elastomer described above, and that has an ester bond in the main chain thereof.

Although the non-elastomer thermoplastic polyester-based resin is not particularly limited, it is preferably the same type of resin as the thermoplastic polyester-based resin included in the hard segment in the thermoplastic polyester-based elastomer described above. Moreover, the non-elastomer polyester-based resin may be either crystalline or amorphous, and examples thereof include aliphatic polyesters and aromatic polyesters. The aliphatic polyester may be a saturated aliphatic polyester or an unsaturated aliphatic polyester.

Aromatic polyesters are generally crystalline, and may be formed from, for example, an aromatic dicarboxylic acid or an ester forming derivative thereof, and an aliphatic diol.

Examples of the aromatic polyester include polyethylene terephthalate, polybutylene terephthalate, polystyrene terephthalate, polyethylene naphthalate, and polybutylene naphthalate; polybutylene terephthalate is preferable.

An example of the aromatic polyester is polybutylene terephthalate derived from terephthalic acid and/or dimethyl terephthalate, and 1,4-butanediol. Moreover, the aromatic polyester may be a polyester derived from a dicarboxylic acid component such as isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, 5-sulfoisophthalic acid, or an ester-forming derivative thereof, and a diol having a molecular weight of 300 or less, examples of which include aliphatic diols such as ethylene glycol, trimethylene glycol, pentamethylene glycol, hexamethylene glycol, neopentyl glycol, and decamethylene glycol, alicyclic diols such as 1,4-cyclohexane dimethanol and tricyclodecane dimethylol, and aromatic diols such as xylylene glycol, bis(p-hydroxy) diphenyl, bis(p-hydroxyphenyl)propane, 2,2-bis[4-(2-hydroxyethoxyl)phenyl]propane, bis[4-(2-hydroxyl)phenyl] sulfone, 1,1-bis[4-(2-hydroxyethoxyl)phenyl]cyclohexane, 4,4'-dihydroxy-p-terphenyl, and 4,4'-dihydroxy-p-quaterphenyl. Moreover, the aromatic polyester may be a copolymer polyester formed using together two or more of the above dicarboxylic acid components and/or two or more of the above diol components. In the aromatic polyester, a polyfunctional carboxylic acid component, a polyfunctional oxyacid component, or a polyfunctional hydroxy component, each of which is tri-functional or higher-functional, may be copolymerized in a range of 5% by mol or less.

A material used as the non-elastomer thermoplastic polyester-based resin may be a commercial product, and examples thereof include DURANEX series (for example, 2000 and 2002) manufactured by Polyplastics Co., Ltd., NOVADURAN series (for example, 5010R5 and 5010R3-2) manufactured by Mitsubishi Engineering-Plastics Corporation, and TORAYCON series (for example, 1401X06 and 1401X31) manufactured by Toray Industries, Inc.

In regard to the aliphatic polyester, a dicarboxylic acid-diol condensation type aliphatic polyester and a hydroxycarboxylic acid condensation type aliphatic polyester are both usable. Examples thereof include polylactic acid, polyhydroxy-3-butylbutyrate, polyhydroxy-3-hexylbutyrate, poly(ε-caprolactone), polyenantholactone, polycaprylolactone, polybutylene adipate, and polyethylene adipate. Polylactic acid is a typical example of a resin used as a biodegradable plastic, and preferable forms of polylactic acid are described below.

Dynamically Crosslinked Thermoplastic Elastomer

A dynamically crosslinked thermoplastic elastomer may be used as the resin material. A dynamically crosslinked thermoplastic elastomer is a thermoplastic elastomer produced by adding rubber into a thermoplastic resin in the molten state, adding a crosslinking agent thereto, and kneading the resultant, so as to perform a crosslinking reaction of the rubber component under the kneaded conditions.

The dynamically crosslinked thermoplastic elastomer is also simply referred to below as "thermoplastic vulcanizates elastomer" (TPV).

Examples of thermoplastic resins that can be used in the manufacture of the TPV include the thermoplastic resins described above (including thermoplastic elastomers). Examples of rubber components that can be used in the manufacture of the TPV include: diene-based rubbers and hydrogenated products thereof (for example, NR, IR, epoxidized natural rubbers, SBR, BR (high-cis BR and low-cis BR), NBR, hydrogenated NBR, and hydrogenated SBR); olefin-based rubbers (for example, an ethylene propylene rubber (EPDM, EPM), a maleic acid-modified ethylene propylene rubber (M-EPM), IIR, a copolymer of isobutylene and an aromatic vinyl or a diene-based monomer, acrylic rubber (ACM), and an ionomer); halogen-containing rubbers (for example, Br-IIR, Cl-IIR, a bromination product of an isobutylene para-methylstyrene copolymer (Br-IPMS), chloroprene rubber (CR), hydrin rubber (CHR), chlorosulfonated polyethylene (CSM), chlorinated polyethylene (CM), and maleic acid-modified chlorinated polyethylene (M-CM)); silicone rubbers (for example, methyl vinyl silicone rubber, dimethyl silicone rubber, and methyl phenyl vinyl silicone rubber); sulfur-containing rubbers (for example, a polysulfide rubber); and fluororubbers (for example, vinylidene fluoride-based rubbers, fluorine-containing vinylether-based rubbers, tetrafluoroethylene-propylene-based rubbers, fluorine-containing silicone-based rubbers, and fluorine-containing phosphazene-based rubbers). In particular, a halogen-containing copolymer rubber of an isomonoolefin and a p-alkylstyreneare, which is a modified polyisobutylene-based rubber, may effectively be used, such as an isobutylene-isoprene copolymer rubber to which halogen groups have been introduced and/or an isobutylene-paramethylstyrene copolymer rubber to which halogen groups have been introduced. Exxpro manufactured by ExxonMobil may be suitably used as the latter.

Thermosetting Resin

Next, the thermosetting resin is described.

Thermosetting resin refers to a polymer compound that becomes to form a three-dimensional mesh structure and harden as the temperature increases. Examples of the thermosetting resin include phenolic resins, epoxy resins, melamine resins, and urea resins. Specifically, examples thereof include those described below.

Phenolic Resin

The phenolic resin is preferably: a monomer of a monomethylol phenol compound, a dimethylol phenol compound, a trimethylol phenol compound, or the like; a mixture of two or more of these monomers; an oligomerization product of any of these monomers; or a mixture of such a monomer and such an oligomer. The monomer is obtained by allowing a compound having a phenolic structure to react with formaldehyde, paraformaldehyde, or the like in the presence of an acid or alkali catalyst, and examples of the compound having a phenolic structure include resorcinol and bisphenol, and include: a substituted phenol that includes one hydroxyl group such as phenol, cresol, xylenol, para-alkylphenol, or para-phenylphenol; a substituted phenol that includes two hydroxyl groups such as catechol, resorcinol, or hydroquinone; a bisphenol such as bisphenol A or bisphenol Z; and a biphenol. A curing agent such as an amine may also be included.

Epoxy Resin

The scope of epoxy resin generally encompasses monomers, oligomers, and polymers, each of which has two or more epoxy groups in a single molecule thereof. The molecular weight and molecular structure thereof are not particularly limited. Examples thereof include biphenyl-type epoxy resins, bisphenol-type epoxy resins, stilbene-type epoxy resins, phenol novolak-type epoxy resins, cresol novolak-type epoxy resins, triphenol methane-type epoxy resins, alkyl-modified triphenol methane-type epoxy resins, triazine nucleus-containing epoxy resins, dicyclopentadiene modified phenol-type epoxy resins, and phenol aralkyl-type epoxy resins (having a phenylene skeleton, a diphenylene skeleton, or the like), and these may be used singly or in mixture of two or more thereof. Of these, biphenyl-type epoxy resins, bisphenol-type epoxy resins, stilbene-type epoxy resins, phenol novolak-type epoxy resins, cresol novolak-type epoxy resins, and triphenol methane-type epoxy resins are preferable. Biphenyl-type epoxy resins, bisphenol-type epoxy resins, phenol novolak-type epoxy resins, and cresol novolak-type epoxy resins are more preferable, and bisphenol-type epoxy resins are particularly preferable. A curing agent, such as an amine, may also be included.

Melamine Resin

Examples of a resin that can be used as the melamine resin include an alkoxymethyl melamine resin. Specifically, a methylated melamine resin, an ethylated melamine resin, a n-butylated melamine resin, an isobutylated melamine resins, or the like, which respectively have a methoxy group, an ethoxy group, an n-butoxy group, an isobutoxy group, or the like as an alkoxy group, are some examples of melamine resins.

The average polymerization degree, in terms of mass average polymerization degree, of the melamine resin is preferably within a range of from 1.1 to 3. When the average polymerization degree is less than 1.1, the melamine resin is more vulnerable to contamination in some cases. However, when the average polymerization degree exceeds 3, workability is decreased in some cases. The average polymerization degree is preferably in a range of from 1.1 to 2.6.

Urea Resin

Examples of the urea resin include methylol ureas such as monomethylol urea, dimethylol urea, and trimethylol urea.

Other General-Purpose Resins

Other than the thermoplastic resin (including thermoplastic elastomers) and the thermosetting resin described above, general-purpose resins such as (meth)acrylic-based resins, EVA resins, vinyl chloride resins, fluororesins, and silicone-based resins may also be used in the resin material.

(Meth)Acrylic-Based Resin (Meth)acrylic-based resin refers to methacrylic-based resins and acrylic-based resins. Methacrylic-based resins include methacrylic acid ester resins that include a methacrylic acid ester such as methyl methacrylate as a repeating unit, and methacrylic acid resins having an unesterified carboxy group. Similarly, acrylic-based resins include acrylic acid ester resins that include an acrylic acid ester such as methyl acrylate as a repeating unit, and acrylic acid resins having an unesterified carboxy group.

Examples of the methacrylic-based resin include: a methacrylic-based monomer such as methacrylic acid, 2-hydroxyethyl methacrylate, 2-hydroxypropyl methacrylate, 2-hydroxybutyl methacrylate, 2-methacryloyloxyethyl succinate, 2-methacryloyloxyethyl hexahydrophthalate, mono(2-methacryloyloxyethyl) acid phosphate, di(2-methacryloyloxyethyl) acid phosphate, glycerin dimethacrylate, 2-hydroxy-3-acryloyloxypropyl methacrylate, 2-hydroxy-3-acryloyloxypropyl methacrylate, bisphenol A-diglycidyl ether methacrylate adduct, diglycerin polyglycidyl ether methacrylate, or 3-chloro-2-hydroxypropyl methacrylate; a homopolymer of any of these methacrylic-based monomers; and a copolymers of any of these methacrylic-based monomers and styrene, silicon, polyester, or the like.

Phosphoric acid esters containing a (meth)acryl group such as di-2-methacryloyloxy ethyl acid phosphate or di-2-acryloyloxy ethyl acid phosphate, and alkali metal salts, ammonium salts, phosphonium salts, and esters of (meth) acrylic acid, are also usable.

The above methacrylic-based resins may be used singly, or in combination of two or more thereof.

Examples of the acrylic-based resin include: an acrylic-based monomer such as acrylic acid, 2-hydroxyethyl acrylate, 2-hydroxypropyl acrylate, 2-hydroxy-3-phenoxypropyl acrylate, 2-acryloyloxyethyl succinate, 2-acryloyloxyethyl phthalate, 2-acryloyloxyethyl 2-hydroxyethyl phthalate, mono(2-acryloyloxyethyl) acid phosphate, di(2-acryloyloxyethyl) acid phosphate, 2-hydroxybutyl acrylate, 2-acryloyloxyethyl hexahydrophthalate, glycerin diglycidylether, 2-hydroxy-3-phenoxypropyl acrylate, bisphenol A diglycidyl ether acrylate adduct, O-phenylphenol glycidyl ether acrylate, 1,4-butanediol diglycidyl ether diacrylate, 1,6-hexanediol diglycidyl ether diacrylate, dipropylene glycol diglycidylether diacrylate, pentaerythritol polyglycidylether acrylate, 2-methyl-2-ethyl-1,3-propanediol diglycidyl ether acrylate, cyclohexane dimethanol diglycidyl ether acrylate, 1,6-hexanediol diglycidyl ether acrylate, glycerin polyglycidyl ether acrylate, ethylene glycoldiglycidyl ether acrylate, polyethylene glycol diglycidyl ether acrylate, dipropylene glycol diglycidyl ether acrylate, polypropylene glycol diglycidyl ether acrylate, 2-hydroxy-1-acryloxy-3-methacryloxypropane, or β-carboxyethylacrylate; a homopolymer of any of these acrylic-based monomers, and a copolymer of any of these acrylic-based monomers and styrene, silicon, polyester, or the like.

These acrylic-based resins may be used singly, or in combination of two or more thereof.

The (meth)acrylic-based resin may be an ionomer resin in which the carboxy group contained in the (meth)acrylic-based resin is crosslinked by a metal such as sodium (Na).

In regard to the (meth)acrylic-based resin, the methacrylic-based resin and the acrylic-based resin may be used singly.

EVA Resin

The EVA resin is a copolymer of ethylene and vinyl acetate (ethylene-vinyl acetate copolymer), and the flexibility thereof can easily be controlled by regulating the content ratio between ethylene and vinyl acetate.

Various EVA resin commercial products are sold, and EVA resins is available as, for example, EVATATE manufactured by Sumitomo Chemical Co., Ltd., NOVATEC manufactured by Japan Polyethylene Corporation, and EVA-FLEX manufactured by Du Pont-Mitsui Polychemicals Co., Ltd.

Vinyl Chloride Resin

A resin for use as the vinyl chloride resin may be a copolymer of vinyl chloride monomer and any of various monomers.

Examples of substances for use as the monomer to be copolymerized include fatty acid vinyl esters such as vinyl acetate and vinyl propionate, acrylates and methacrylates such as methyl (meth)acrylate, ethyl (meth)acrylate, isopropyl (meth)acrylate, butyl (meth)acrylate, and benzyl (meth) acrylate, alkyl allyl ethers such as allyl methyl ethers, allyl ethyl ethers, allyl propyl ethers, and allyl butyl ethers, and other monomers such as styrene, α-methylstyrene, vinylidene chloride, acrylonitrile, ethylene, butadiene, and acrylamide, and copolymerization monomers having a functional group such as vinyl alcohol, 2-hydroxyethyl (meth) acrylate, polyethyleneglycol (meth)acrylate, 2-hydroxypropyl (meth)acrylate, 3-hydroxypropyl (meth)acrylate, polypropyleneglycol (meth)acrylate, 2-hydroxyethyl allyl ether, 2-hydroxypropyl allyl ether, 3-hydroxypropyl allyl ether, p-vinylphenol, maleic acid, maleic acid anhydride, acrylic acid, methacrylic acid, glycidyl (meth)acrylate, allyl glycidyl ether, phosphoethyl (meth)acrylate, sulfoethyl (meth)acrylate, and p-styrenesulfonic acid, and sodium salts, potassium salts, and the like of these monomers.

These resins may be used singly, or in a blend of two or more thereof, as necessary.

A material used as the vinyl chloride resin may be a commercially available product, and examples thereof include G351 and G576 (both manufactured by Zeon Corporation).

Fluororesin

A fluororesin is a resin that includes a fluorine atom in a molecule thereof, and examples thereof include a resin obtained by replacing, for example, one or more hydrogen atoms in the thermoplastic resin (including the thermoplastic elastomer) or thermosetting resin described above by one or more fluorine atoms.

Examples thereof include tetrafluoro ethylene resin, trifluoro chloro ethylene resin, hexafluoro propylene resin, vinyl fluoride resin, vinylidene fluoride resin, bisfluoro bischloro ethylene resin, polytetrafluoroethylene, polychloro trifluoro ethylene, and perfluoro alkoxy fluororesin, and copolymers thereof.

Examples further include fluorine resins such as tetrafluoroethylene-perfluoroalkyl vinyl ether copolymer (PFA), tetrafluoroethylene-perfluoro methyl vinyl ether copolymer (MFA), tetrafluoroethylene-perfluoro ethyl vinyl ether copolymer (EFA), polytetrafluoroethylene (PTFE), tetrafluoroethylene-hexafluoropropylene copolymer (FEP), polyethylene-tetrafluoroethylene (ETFE), polyfluoride vinylidene (PVDF), polychloro trifluoride ethylene (PCTFE), and vinyl fluoride (PVF).

In particular, in view of heat resistance, mechanical properties, and the like, polytetrafluoroethylene (PTFE), tetrafluoroethylene-perfluoro alkyl vinyl ether copolymer (PFA), tetrafluoroethylene-perfluoro methyl vinyl ether copolymer (MFA), and tetrafluoroethylene-perfluoro ethyl vinyl ether (EFA) copolymer are suitable for use.

One of, or two or more of, these fluororesins may be selected and used.

Silicone-Based Resin

The silicone-based resin is a polymer compound having a siloxane bond in the main chain thereof or in a side chain thereof.

Examples thereof include methyl silicone, phenyl silicone, and phenyl methyl silicone. One of, or two or more of, these silicone-based resins may be selected and used.

The silicone-based resin to be used may be a commercially available product, and, for example, Clinbell manufactured by Fuji Chemical Industries, Ltd. can suitably be used.

Engineering Plastic and Super Engineering Plastic

Other than the resins described above, a so-called engineering plastic or a super engineering plastic may be used in the resin material.

An engineering plastic is a resin having a heatproof temperature limit (deflection temperature under load) of 100° C. or higher. Accordingly, among the thermoplastic resins and the thermosetting resins described above, resins having a heatproof temperature limit of 100° C. or higher are also referred to as engineering plastics.

Among engineering plastics, those having a strength of 49.0 MPa, a bending elastic modulus of 2.4 GPa or more, and a heatproof temperature limit of 150° C. or higher are usually referred to as super engineering plastics.

Resins, other than the resins described above, particularly classified as engineering plastics are described below.

Examples of engineering plastics (including super engineering plastics) include polycarbonate, liquid crystal polymers, polyphenylene ether, polyphenylene sulfide, amorphous polyarylate, polysulfone, polyether ether ketone, polyether imide, polyamide imide, polyimide, and polyacetal.

Polycarbonate

A polycarbonate is an aliphatic or aromatic polycarbonate resin. Examples of the aromatic polycarbonate include aromatic homo-carbonates and aromatic co-polycarbonates obtained by allowing an aromatic bivalent phenolic compound to react with phosgene or a carbonate diester. The aromatic polycarbonate for use preferably has a glass transition temperature within a range of from 100° C. to 155° C., as measured by a differential calorimeter.

Examples of aromatic bivalent phenol-based compounds that can be used include 2,2-bis(4-hydroxyphenyl)propane, 2,2-bis(4-hydroxy-3,5-dimethylphenyl)propane, bis(4-hydroxyphenyl)methane, 1,1-bis(4-hydroxyphenyl)ethane, 2,2-bis(4-hydroxyphenyl)butane, 2,2-bis(4-hydroxy-3,5-diphenyl)butane, 2,2-bis(4-hydroxy-3,5-diethylphenyl)propane, 2,2-bis(4-hydroxy-3,5-diethylphenyl)propane, 1,1-bis(4-hydroxyphenyl)cyclohexane, and 1-phenyl-1,1-bis(4-hydroxyphenyl)ethane. These may be used singly, or in mixture thereof. Further, for example, one or more hindered phenol-based, sulfur-based, or phosphorus-based antioxidants may also be included.

Liquid Crystal Polymer

Examples of the liquid crystal polymer include polycondensates of ethylene terephthalate and p-hydroxybenzoic acid, polycondensates of phenol, phthalic acid and p-hydroxybenzoic acid, and polycondensates of 2,6-hydroxynaphthoic acid and p-hydroxybenzoic acid.

Polyphenylene Ether

A polyphenylene ether refers to a homopolymer of the following repeating unit (PPE-1) or the following repeating unit (PPE-2), or a copolymer that includes at least one of the repeating unit (PPE-1) or the repeating unit (PPE-2).

In general, a polyphenylene ether that includes the repeating unit (PPE-1), but does not include the repeating unit (PPE-2) is referred to as a "modified polyphenylene ether". The modified polyphenylene ether may be an acid-modified product having an acid group such as a carboxy group in a molecule thereof.

(PPE-1)

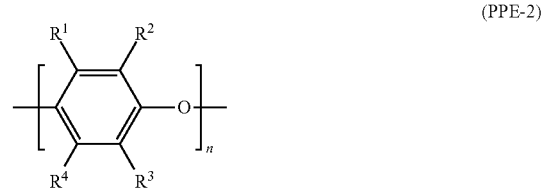

(PPE-2)

$R^1$ to $R^4$ in the repeating unit (PPE-2) each independently represent an alkyl group or an aryl group. In the repeating unit (PPE-1) and the repeating unit (PPE-2), n is the number of repeating units.

Typical examples of homopolymers of polyphenylene ether include poly(1,4-phenylene) ether, poly(2,6-dimethyl-1,4-phenylene) ether, poly(2,5-dimethyl-1,4-phenylene) ether, poly(2-methyl-6-ethyl-1,4-phenylene) ether, poly(2,6-diethyl-1,4-phenylene) ether, poly(2,6-diphenyl-1,4-phenylene) ether, and poly(2,3,6-trimethyl-1,4-phenylene) ether. Among these, poly(2,6-dimethyl-1,4-phenylene) ether is particularly preferable. An example of the polyphenylene ether copolymer is a copolymer of 2,6-dimethylphenol and another phenol (for example, 2,3,6-trimethylphenol, 2,6-diphenylphenol, or 2-methylphenol(o-cresol)).

The polyphenylene ether to be used may be a commercially available product. Examples thereof include XYRON (a polymer alloy of a thermoplastic polyphenylene ether and a thermoplastic polystyrene-based resin) manufactured by Asahi Kasei Chemicals Corporation, and NORYL PX9701 (poly(2,6-dimethyl-1,4-phenylene)ether) manufactured by GE Plastics.

Polyphenylene Sulfide

The polyphenylene sulfide includes p-phenylene sulfide groups as main repeating units, and may have a straight chain structure, a branched structure, a crosslinked structure, or any mixture of these structures. The polyphenylene sulfide may be a copolymer further including a repeating unit such as an m-phenylene sulfide group.

Amorphous Polyarylate

Examples of the amorphous polyarylate include bisphenol A/terephthalic acid, bisphenol A/isophthalic acid, and bisphenol A/terephthalic acid/isophthalic acid.

Polysulfone

A polysulfone is a resin that includes an aromatic ring, a sulfonyl group, and an ether group in the main chain thereof as repeating units, and is also referred to as a polyether sulfone.

Specifically, the polysulfone is expressed as, for example, a polymer compound having the following repeating unit (S-1) or the following repeating unit (S-2). In the repeating Unit (S-1) and the repeating unit (S-2), n represents the number of repeating units, and is an integer of, for example, from 50 to 80.

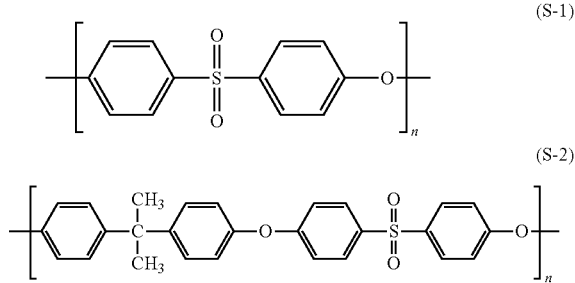

Specific examples of the polysulfone include polysulfones such as UDEL polysulfone P-1700 and P-3500 (manufactured by Teijin Amoco), ULTRASON S3010 and S6010 (manufactured by BASF SE), VICTREX (Sumitomo Chemical Co., Ltd.), REDEL A (manufactured by Teijin Amoco), or ULTRASON E (manufactured by BASF SE). Although the polysulfone is preferably a compound formed only of at least one of the repeating unit (S-1) or the repeating unit (S-2), other monomers may also be copolymerized as far as the effects of the invention is not impaired.

Polyether Ether Ketone

Examples of the polyether ether ketone include a resin having the following repeating unit (EEK-1).

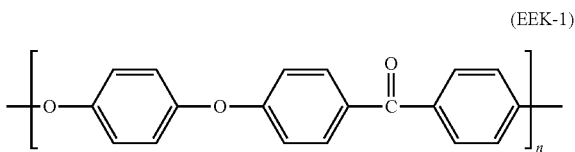

In the Repeating Unit (EEK-1) above, n represents the number of repeating units. Examples of polyether ether ketones having the repeating unit represented by the repeating Unit (EEK-1) include VICTREX PEEK, trade name manufactured by VICTREX plc.

Polyether Imide

The polyether imide may be any polymer that includes an aliphatic, alicyclic, or aromatic ether unit and a cyclic imide group as repeating units, and that has melt-formability, and the polyether imide is not particularly limited in other respects. Examples thereof include polyether imides disclosed in U.S. Pat. No. 4,141,927, Japanese Patent Nos. 2622678, 2606912, 2606914, 2596565, 2596566, and 2598478, and polymers disclosed in Japanese Patent Nos. 2598536, 2599171, JP-A H09-48852, Japanese Patent Nos. 2565556, 2564636, 2564637, 2563548, 2563547, 2558341, 2558339, and 2834580. Within a range that does not hinder the effects of the invention, the main chain of the polyether imide may include structural units other than cyclic imides and ether units; examples of such other structural units include aromatic, aliphatic, or alicyclic ester units and oxycarbonyl units.

A commercially available product may be used as the polyether imide.

For example, a polyether imide that is a condensate of 2,2-bis[4-(2,3-dicarboxy phenoxy)phenyl]propane dianhydride with m-phenylene diamine or p-phenylene diamine, is available from General Electric under the trade name ULTEM (registered trademark).

Polyamide Imide

More specifically, examples of the polyamide imide include: a polyamide imide having a siloxane component as a polymer component; a polyamide imide including, as polymerization components, a diisocyanate component or diamine component having a cyclic hydrocarbon group (an alicyclic hydrocarbon group and/or an aromatic hydrocarbon group) and an acid component such as an acid anhydride, a polyvalent carboxylic acid, or an acid chloride; and a product obtained by copolymerizing a polyester or the like, such as polycaprolactone, with the polyamide imide described above.

These polyamide imides may be contained singly, or in combination of two or more thereof.

Polyimide

A polyimide is a resin having an imide bond in the main chain thereof.

The polyimide may be, for example, a product obtained by imidization of a polyamic acid as a precursor, the polyamic acid being obtained by polymerization of a tetracarboxylic acid dianhydride and a diamine or triamine compound in a solvent.

Examples of the tetracarboxylic acid dianhydride include tetracarboxylic acid dianhydrides having a cyclic aliphatic structure.

Specific examples of tetracarboxylic acid dianhydrides having a cyclic aliphatic structure include 1,2,3,4-butane tetracarboxylic acid dianhydride, 3,5,6-tricarboxy norbonane-2-acetic acid dianhydride, 2,3,4,5-tetrahydrofuran tetracarboxylic acid dianhydride, bicyclo[2,2,2]-oct-7-ene-2,3,5,6-tetracarboxylic acid dianhydride, 4-(2,5-dioxotetrahydrofuran-3-yl)-1,2,3,4-tetrahydronaphthalene-1,2-dicarboxylic acid dianhydride, 5-(2,5-dioxotetrahydrofuryl)-3-methyl-cyclohexane-1,2-dicarboxylic acid dianhydride, and 2,3,5-tricarboxycyclopentylacetic acid dianhydride.

An aromatic tetracarboxylic acid anhydride having a bent structure in a molecule thereof may be used as the tetracarboxylic acid dianhydride described above.

Specific examples of aromatic tetracarboxylic acid anhydrides having a bent structure in a molecule thereof include 3,3',4,4'-diphenylether tetracarboxylic acid dianhydride, bis 3,3',4,4'-tetraphenylsilane tetracarboxylic acid dianhydride, 1,2,3,4-furan tetracarboxylic acid dianhydride, 4,4'-bis(3,4-dicarboxyphenoxy) diphenylsulfide dianhydride, 4,4'-bis(3,4-dicarboxyphenoxy) diphenylsulfone dianhydride, 4,4'-bis(3,4-dicarboxyphenoxy) diphenylpropane dianhydride, and 3,3',4,4'-perfluoroisopropylidene diphthalic acid dianhydride.

These tetracarboxylic acid dianhydrides may be used singly, or in combination of two or more thereof.

Examples of the diamine or triamine compound include aromatic diamine or triamine compounds, and aliphatic diamine or triamine compounds. The diamine or triamine compound may include a polar group, such as a carboxyl group or a hydroxy group.

Specific examples of aromatic diamine or triamine compounds include 4,4'-diaminodiphenylether, 4,4'-diaminodiphenylmethane, 3,3'-diaminodiphenylmethane, 3,3'-dichlorobenzidine, 4,4'-diaminodiphenylsulfide, 3,3'-diaminodiphenylsulfone, 1,5-diaminonaphthalene, m-phenylene diamine, p-phenylene diamine, 3,3'-dimethyl-4,4'-biphenyldiamine, 3,3'-dimethylbenzidine, 3,3'-dimethoxybenzidine, 4,4'-diaminodiphenylsulfone, 4,4'-diaminodiphenylpropane, 2,4-bis(β-aminotertiary butyl)toluene, bis (p-β-amino-tertiary butylphenyl)ether, bis(p-β-methyl-δ-aminophenyl)benzene, bis-p-(1,1-dimethyl-5-amino-bentyl) benzene, 1-isopropyl-2,4-m-phenylene diamine, m-xylylene diamine, p-xylylene diamine, 3,5-diaminobenzoic acid, 3,3'-dicarboxy-4,4'-diaminophenylmethane, 2,4,4'-biphenyltriamine, pyridine-2,3,6-triamine, and 1,3,5-triaminobenzene.

Examples of aliphatic diamine or triamine compounds include aliphatic diamine or triamines and alicyclic diamines, such as 1,1-metaxylylene diamine, 1,3-propane diamine, tetramethylene diamine, pentamethylene diamine, octamethylene diamine, nonamethylene diamine, 4,4-diaminoheptamethylene diamine, 1,4-diaminocyclohexane, isophorone diamine, tetrahydrodicyclopentadienylene diamine, hexahydro-4,7-methanoindanylene dimethylene diamine, tricyclo[6,2,1,02.7]-undecylen-dimethyldiamine, 4,4'-methylene bis(cyclohexylamine), pentan-1,2,5-triamine, and bis(hexamethylene)triamine.

The above diamine or triamine compounds may be used singly, or in combination of two or more thereof.

The polyimide may be synthesized by allowing a polyamic acid to undergo a dehydration ring-closing reaction under heating or the like so as to imidize the polyamic acid, the polyamic acid being obtained by a reaction of any of the tetracarboxylic acid dianhydrides exemplified above and any of the diamine or triamine compounds exemplified above in the same equivalents in a solvent.

Examples of the above imidization include heat imidization methods and chemical imidization methods.

Examples of the heat imidization methods include a method in which a polyamic acid solution is heated to a temperature of from 100° C. to 250° C.

Examples of the chemical imidization methods include a method in which a catalyst, such as a tertiary amine, and a dehydrating agent, such as acetic acid anhydride, are added to a polyamic acid solution. In a case in which the above chemical imidization method is used, the reaction will proceed even at room temperature (for example, at 25° C.). However, the reaction may be carried out at a temperature of from 60° C. to 150° C. in order to accelerate the chemical reaction. Although the catalyst and dehydrating agent may be removed after the reaction, the imidized product may be used as it is, in which the catalyst and the dehydrating agent are still present. Examples of methods for removing the catalyst and the dehydrating agent include a method including removing the catalyst and the dehydrating agent by heating and/or pressure-reducing the reaction solution, and a method including removing the catalyst and the dehydrating agent by reprecipitating the polyimide resin by adding the reaction solution to a poor solvent.

Polyacetal

A polyacetal is a resin that includes oxymethylene units as main repeating units.

Examples of the polyacetal include so-called polyacetal homopolymers obtained by a polymerization reaction using formaldehyde or trioxane as a main starting material. Moreover, the polyacetal may be a polyacetal copolymer. The polyacetal copolymer is formed mainly of oxymethylene units, and includes 15% by mass or less of oxyalkylene units having from 2 to 8 adjacent carbon atoms in the main chains thereof.

The polyacetal may be a copolymer that includes other structural units, and that may be any of a block copolymer, terpolymer, or crosslinked polymer. These polyacetals may be used singly, or in combination of two or more thereof. From the viewpoint of thermal stability, the polyacetal is preferably a polyacetal copolymer.

Other Resins

Other than the above, diallyl phthalate resins, methylpentene resins, biodegradable plastics, and the like, are also usable.

A biodegradable plastic is an environmentally friendly plastic that has low combustion energy and does not generate poisonous gas, that is metabolically decomposed by microorganisms over time, and that eventually returns to nature in the form of water and carbon dioxide.

Polylactic acid, mixtures of starch and modified polyvinyl alcohol, polybutylene succinate-adipate copolymers, polycaprolactone, and polyhydroxybutyrate-valerate copolymers are typical biodegradable plastics.

A polylactic acid resin is a polymer that includes L-lactic acid and/or D-lactic acid as a main component, and that may further include other copolymerization components than lactic acid. Examples of other monomer units include: glycol compounds such as ethylene glycol, propylene glycol, butane diol, heptane diol, hexane diol, octane diol, nonane diol, decane diol, 1,4-cyclohexane dimethanol, neopentylglycol, glycerin, pentaerythritol, bisphenol A, polyethylene glycol, polypropylene glycol, and polytetramethylene glycol; dicarboxylic acids such as oxalic acid, adipic acid, sebacic acid, azelaic acid, dodecanedioic acid, malonic acid, glutaric acid, cyclohexane dicarboxylic acid, terephthalic acid, isophthalic acid, phthalic acid, naphthalene dicarboxylic acid, bis(p-carboxyphenyl)methane, anthracene dicarboxylic acid, 4,4'-diphenylether dicarboxylic acid, 5-sodium sulfoisophthalic acid, and 5-tetrabutylphosphonium isophthalic acid; hydroxycarboxylic acids such as glycolic acid, hydroxypropionic acid, hydroxybutyric acid, hydroxyvaleric acid, hydroxycaproic acid, and hydroxybenzoic acid; and lactones such as caprolactone, valerolactone, propiolactone, undecalactone, and 1,5-oxepane-2-one.

Additives

The resin material constituting the tire frame body may further include various additives.

Examples of the additives include functional components, such as a plasticizer that plasticizes a thermosetting resin or a super engineering plastic, an anti-aging agent, an ultraviolet absorbent, a flame retardant, or an antistatic agent, and rubbers.

These additives may be included in the resin material constituting the tire frame body in addition to the first resin material and the second resin material. These additives may be included in the first resin material. These additives may be included in the second resin material.

As described above, in the tire according to the invention, the resin material may include at least one selected from the group consisting of a plasticizer, an anti-aging agent, an ultraviolet absorbent, a flame retardant, and an antistatic agent.

The resin material constituting the tire frame body in the tire according to the invention may include, in addition to the first resin material and the second resin material described above, at least one selected from the group consisting of a plasticizer, an anti-aging agent, an ultraviolet absorbent, a flame retardant, and an antistatic agent. By including such components in the resin material, various functionalities can be imparted to the tire. For example, when an anti-aging agent is included in the resin material, aging, such as deterioration due to oxidation, can be suppressed. Moreover, when a flame retardant is included in the resin material, the tire is less susceptible to combustion, even in a case in which the excessive friction has occurred to the tire due to, for example, sudden braking. Moreover, including an antistatic agent in the resin material makes it possible to prevent accumulation of charge, such as static electricity, on the tire.

Plasticizer

In order to adjust the elastic modulus of a tire frame body, the resin material may also include a plasticizer in addition to the first resin material and the second resin material. The first resin material may include a plasticizer. The second resin material may include a plasticizer.

In particular, when the first resin material, which should be softer than the island phase, includes a resin having a large elastic modulus such as a thermosetting resin or a super engineering plastic, the first resin preferably includes a plasticizer. Due to the inclusion of a plasticizer in the first resin material together with a resin having a large elastic modulus such as a thermosetting resin or a super engineering plastic, the resin having a large elastic modulus such as a thermosetting resin or a super engineering plastic is plasticized, whereby the first resin material can be made to have a smaller elastic modulus than that of the second resin material constituting the island phase.

The first resin material may include a plasticizer, irrespective of the type of resin contained in the first resin material. The first resin material may be, for example, a resin material that includes a thermoplastic resin and a plasticizer.

The second resin material constituting the island phase, which is harder than the sea phase, may include a plasticizer. Similar to the above, the second resin material may include a plasticizer, irrespective of the type of resin contained in the second resin material.

The content of plasticizer in the resin material constituting the tire frame body, the content of plasticizer in the first resin material, and the content of plasticizer in the second resin material, may be suitably adjusted such that the elastic modulus of the first resin material and the elastic modulus of the second resin material have a relationship in which the island phase is made harder than the sea phase.

Examples of plasticizers include: a phthalic acid derivative such as dimethyl phthalate, diethyl phthalate, di-n-butyl phthalate, di-(2-ethylhexyl) phthalate, diheptyl phthalate, diisodecyl phthalate, di-n-octyl phthalate, diisononyl phthalate, ditridecyl phthalate, octyldecyl phthalate, butylbenzyl phthalate, or dicyclohexyl phthalate; an isophthalic acid derivative such as dimethyl isophthalate; a tetrahydrophthalic acid derivative such as di-(2-ethylhexyl) tetrahydrophthalate; an adipic acid derivative such as dimethyl adipate, dibutyl adipate, di-n-hexyl adipate, di-(2-ethylhexyl)adipate, isononyl adipate, diisodecyl adipate, or dibutyldiglycol adipate; an azelaic acid derivative such as di-2-ethylhexyl azelate; a sebacic acid derivative such as dibutyl sebacate; a dodecanedioic-2-acid derivative; a maleic acid derivative such as dibutyl maleate or di-2-ethylhexyl maleate; a fumaric acid derivative such as dibutyl fumarate; a trimellitic acid derivative such as tris-2-ethylhexyl trimellitate; a pyromellitic acid derivative; a citric acid derivative such as acetyltributyl citrate; an itaconic acid derivative; an oleic acid derivative; a ricinoleic acid derivative; a stearic acid derivative; another fatty acid derivative; a sulfonic acid derivative; a phosphoric acid derivative; a glutaric acid derivative; a polyester-based plasticizer that is a polymer of a dibasic acid such as adipic acid, azelaic acid, or phthalic acid, with a glycol, a monohydric alcohol, or the like; a glycol derivative; a glycerin derivative; a paraffin derivative, such as chlorinated paraffin; an epoxy derived polyester-based polymer plasticizer; a polyether-based polymer plasticizer; and a carbonate derivative such as ethylene carbonate or propylene carbonate. Plasticizers in the invention are not limited to these, and various plasticizers may be used. Plasticizer products widely sold as rubber plasticizers are also usable.

Examples of commercially sold plasticizers include THIOKOL TP (manufactured by Morton), and ADEKA CIZER (registered trademark) O-130P, C-79, UL-100, P-200, and RS-735 (manufactured by Asahi Denka Co., Ltd.). Examples of other high molecular weight plasticizers include acrylic-based polymers, polypropylene glycol-based polymers, polytetrahydrofuran-based polymers, and polyisobutylene-based polymers. Among these, adipic acid derivatives, phthalic acid derivatives, glutaric acid derivatives, trimellitic acid derivatives, pyromellitic acid derivatives, polyester-based plasticizers, glycerin derivatives, epoxy derived polyester-based polymeric plasticizers, polyether-based polymeric plasticizers, and the like, which are plasticizers having low volatility and exhibits little reduction in amount when heated, are preferable.

Rubber

In order to adjust the elastic modulus of the tire frame body, the resin material may include a rubber, such as a natural rubber or a synthetic rubber, in addition to the first resin material and the second resin material. The first resin material may include a rubber, such as a natural rubber or a synthetic rubber. The second resin material may include a rubber, such as a natural rubber or a synthetic rubber.

The term "rubber" as used herein refers to a polymer compound having elasticity.

In the present specification, rubber is distinguished from the thermoplastic elastomer that is a thermoplastic resin material formed of a copolymer including a polymer constituting a crystalline hard segment having a high melting point and a polymer constituting an amorphous soft segment having a low glass transition temperature.

The rubber is not particularly limited. Examples of the rubber include natural rubbers (NR), isoprene rubbers (IR), butadiene rubbers (BR), styrene-butadiene copolymer rubbers (SBR), acrylonitrile-butadiene copolymer rubbers (NBR), chloroprene rubbers (CR), butyl rubbers (IIR), halogenated butyl rubbers (such as Br-IIR, or Cl-IIR), and ethylene-propylene-diene rubbers (EPDM). NIR and NBIR are also usable, NIR being a rubber in which all of the butadiene units in an acrylonitrile-butadiene copolymer rubber has been replaced by isoprene units, and NBIR being a rubber in which some of the butadiene units in an acrylonitrile-butadiene copolymer has been replaced by isoprene units.

Of these, from the viewpoint that the flexibility of the respective resin materials can easily be controlled, BR, SBR, NBR, NIR, and NBIR are preferable, and BR, SBR, IR, and NBR are more preferable.

From the viewpoints of raising the tensile elastic modulus of rubber, fixing the particle size of dispersed rubber, and improving creep, a vulcanized rubber obtained by vulcanizing a rubber may be used. Vulcanization of the rubber may be performed using a known method, and may be performed using, for example, methods described in JP-A Nos. H11-048264, H11-029658, 2003-238744, and the like. In a case in which a rubber is to be blended with a thermoplastic polyamide-based elastomer, the rubber is preferably pulverized to minute sizes before being added to the thermoplastic polyamide-based elastomer. In particular, dynamic crosslinking is preferably used in which dispersing and crosslinking (vulcanization) of the rubber is performed while the rubber and the thermoplastic polyamide-based elastomer are kneaded.

Vulcanization of rubber may be performed by adding substances such as a reinforcing material such as carbon black, a filler, a vulcanization agent, a vulcanization accelerator, a fatty acid or salt thereof, a metal oxide, a process oil, and an anti-aging agent into the rubber, as appropriate, and kneading the resultant blend using a Banbury mixer, and thereafter heating the blend at a temperature of from 120° C. to 235° C.

The vulcanization agent to be used may be a known vulcanization agent, such as sulfur, an organic peroxide, or a resin vulcanization agent.

The vulcanization accelerator to be used may be a known vulcanization accelerator, such as an aldehyde, an ammonia, an amine, a guanidine, a thiourea, a thiazole, a sulfenamide, a thiuram, a dithiocarbamate, or a xanthate.

Examples of the fatty acid include stearic acid, palmitic acid, myristic acid, and lauric acid, and these may be added in a salt form, for example, in the form of zinc stearate. Of these, stearic acid is preferable.

Examples of the metal oxide include zinc oxide (ZnO), iron oxide, and magnesium oxide. Of these, zinc oxide is preferable.

The process oil to be used may be any of an aromatic process oil, a naphthene-based process oil, and a paraffin-based process oil.

Examples of the anti-aging agent include amine-ketone-based anti-aging agent, imidazole-based anti-aging agent, amine-based anti-aging agent, phenol-based anti-aging agent, sulfur-based anti-aging agent, and phosphorus-based anti-aging agent.

Functional Component

The resin material may include various functional components in addition to the first resin material and the second resin material, so as to impart various functionalities to the tire. Various functional components may be included in the first resin material. Various functional components may be included in the second resin material.

Examples of functional components include an anti-aging agent, an ultraviolet absorbent, a flame retardant, and an antistatic agent.

Anti-Aging Agent

Inclusion of an anti-aging agent in the resin material suppresses aging of the resin material, such as oxidative degradation.

Examples of the anti-aging agent include, besides the above-described anti-aging agents usable in the vulcanization of rubber: amine-based anti-aging agents such as phenyl-α-naphthylamine (PAN), octyl diphenylamine, N,N'-diphenyl-p-phenylene diamine (DPPD), N,N'-di-β-naphthyl-p-phenylene diamine (DNPD), N-(1,3-dimethylbutyl)-N'-phenyl-p-phenylene diamine, N-phenyl-N'-isopropyl-p-phenylene diamine (IPPN), N,N'-diallyl-p-phenylene diamine, phenothiazine derivatives, diallyl-p-phenylene diamine mixtures, alkylated phenylene diamine, 4,4'-bis(α,α-dimethylbenzyl)diphenylamine, N-phenyl-N'-(3-methacryloyloxy-2-hydropropyl)-p-phenylene diamine, diallylphenylene diamine mixture, diallyl-p-phenylene diamine mixture, N-(1-methylheptyl)-N'-phenyl-p-phenylene diamine, or diphenylamine derivatives, imidazole-based anti-aging agents such as 2-mercaptobenzimidazole (MBI), phenol-based anti-aging agents such as 2,6-di-t-butyl-4-methylphenol, and pentaerythrityltetrakis[3-(5-di-t-butyl-4-hydroxyphenol)-propionate]; phosphate-based anti-aging agents such as nickel diethyl-dithiocarbamate; secondary anti-aging agents such as triphenylphosphite; 2-t-butyl-6-(3-t-butyl-2-hydroxy-5-methylbenzyl)-4-methylphenyl acrylate; and 2-[1-(2-hydroxy-3,5-di-t-pentylphenyl)ethyl]-4,6-di-t-pentylphenyl acrylate. These may be used singly, or in combination of two or more thereof.

Ultraviolet Absorbent

Inclusion of an ultraviolet absorbent in the resin material suppresses deterioration of the resin material caused by ultraviolet irradiation, even in environments where the tire is exposed to direct sunlight.

Examples of the ultraviolet absorbent include 4-t-butylphenyl salicylate, 2,4-dihydroxy benzophenone, 2,2'-dihydroxy-4-methoxy benzophenone, ethyl-2-cyano-3,3'-diphenyl acrylate, 2-ethylhexyl-2-cyano-3,3'-diphenyl acrylate, 2-hydroxy-5-chlorobenzophenone, 2-hydroxy-4-methoxybenzophenone-2-hydroxy-4-octoxy benzophenone, monoglycol salicylate, oxalic acid amide, and 2,2',4,4'-tetrahydroxybenzophenone. A light stabilizer is also usable.

These may be used singly, or in combination of two or more thereof.

Examples of specific products of anti-aging agents and ultraviolet absorbents include IRGANOX (registered trademark) 1010 (manufactured by Ciba Specialty Chemicals), SANOL (registered trademark) LS770 (manufactured by Sankyo Lifetech Co., Ltd.), ADEKA STAB (registered trademark) LA-57 (manufactured by Asahi Denka Co., Ltd.), ADEKA STAB LA-68 (manufactured by Asahi Denka Co., Ltd.), CHIMASSORB (registered trademark) 944 (manufactured by Ciba Specialty Chemicals), SANOL LS765 (manufactured by Sankyo Lifetech Co., Ltd.), ADEKA STAB LA-62 (manufactured by Asahi Denka Co., Ltd.), TINUVIN (registered trademark) 144 (manufactured by Ciba Specialty Chemicals), ADEKA STAB LA-63 (manufactured by Asahi Denka Co., Ltd.), TINUVIN 622 (manufactured by Ciba Specialty Chemicals), ADEKA STAB LA-32 (manufactured by Asahi Denka Co., Ltd.), ADEKA STAB LA-36 (manufactured by Asahi Denka Co., Ltd.), TINUVIN 571 (manufactured by Ciba Specialty Chemicals), TINUVIN 234 (manufactured by Ciba Specialty Chemicals), ADEKA STAB LA-31 (manufactured by Asahi Denka Co., Ltd.), TINUVIN 1130 (manufactured by Ciba Specialty Chemicals), ADEKA STAB AO-20 (manufactured by Asahi Denka Co., Ltd.), ADEKA STAB AO-50 (manufactured by Asahi Denka Co., Ltd.), ADEKA STAB 2112 (manufactured by Asahi Denka Co., Ltd.), ADEKA STAB PEP-36 (manufactured by Asahi Denka Co., Ltd.), SUMILIZER GM (Sumitomo Chemical Co., Ltd.), SUMILIZER GS (Sumitomo Chemical Co., Ltd.), and SUMILIZER TP-D (Sumitomo Chemical Co., Ltd.).

These may be used singly, or in combination of two or more thereof.

Flame Retardant

Inclusion of a flame retardant in the resin material makes the tire less susceptible to combustion, even in a case in which excessive friction has occurred to the tire due to, for example, sudden braking, and the tire is ignited.

Examples of the flame retardant include, but are not limited to, triphenylphosphate, tricresylphosphate, tris(chloropropyl)phosphate, polyphosphate, phosphate-based polyols, decabromobiphenyl, decabromobiphenylether, antimony trioxide, ammonium phosphate, ammonium polyphosphate, phosphoric acid guanidine, perchlorocyclodecane, aluminum hydroxide, magnesium hydroxide, chlorinated paraffins, polyethylene chloride, perchlorocyclodecane, boron-based compounds, and zirconium-based compounds.

These may be used singly, or in combination of two or more thereof.

Antistatic Agent

Accumulation of charge on the tire, such as static electricity, can be prevented by including an antistatic agent in the resin material.

Examples of the antistatic agent include inorganic antistatic agents and organic antistatic agents.

Specific examples of the inorganic antistatic agent include alkali metal salts such as sodium chloride and potassium chloride, and alkaline earth metal salts such as calcium chloride and barium chloride.

Examples of organic antistatic agents include various glycerin-based antistatic agents and amine-based antistatic agents, such as glycerin fatty acid esters, polyoxyethylene alkylphenyl ethers, alkyldiethanol amines, hydroxyalkyl monoethanol amines, polyoxyethylene alkylamines, polyoxyethylene alkylamine fatty acid esters, and alkyldiethanol amides.

Among organic antistatic agents, examples of anionic antistatic agents include alkyl sulfonates, alkylbenzene sulfonates, alkylphosphates, polyacrylates, polystyrene sulfonates, and polymaleates.

Examples of cationic antistatic agents include various quaternary ammonium salts such as a tetraalkyl ammonium salts and trialkyl benzyl ammonium salts.

Examples of amphoteric antistatic agents include alkylbetaines and alkylimidazolium betaines.

These may be used singly, or in combination of two or more thereof.

The content of the above additives in each of the resin materials may be suitably adjusted so as to exhibit the desired functionality, to the extent at which the effect according to the invention in terms of heat resistance is not impaired.

Properties of Resin Material

Preferable physical properties of the resin material constituting the tire frame body (the resin material having a sea-island structure including a sea phase constituted by the first resin material and an island phase constituted by the second resin material, the island phase being harder than the sea phase) are described below.

The melting point (or softening point) of the resin material (tire frame body) itself is normally from 100° C. to 350° C., preferably from approximately 100° C. to approximately 250° C. From the viewpoint of manufacturability of the tire, the melting point (or softening point) of the resin material (tire frame body) itself is preferably from approximately 120° C. to approximately 250° C., and more preferably from 120° C. to 200° C.

Suppose that, for example, a frame of a tire is formed by fusing together divided bodies (frame pieces), use of a resin material having a melting point of from 120° C. to 250° C. provides sufficient adhesion strength between the tire frame pieces, even in a frame obtained by fusing at a surrounding temperature within a range of from 120° C. to 250° C. The tire according to the invention accordingly has excellent durability during travelling, such as puncture resistance and abrasion resistance. The heating temperature is preferably a temperature that is higher than the melting point (or softening point) of the resin material forming the tire frame pieces by 10° C. to 150° C., more preferably by 10° C. to 100° C.

The resin material may be obtained by mixing together the first resin material and second resin material described above, adding various additives, if necessary, and mixing the resultant, as appropriate, using a known method (for example, melt mixing).

As stated above, usually a sea-island structure in which the first resin material constitutes the sea phase, and in which the second resin material constitutes the island phase, is formed when the ratio ($M_1/M_2$) of the content by mass of the first resin material constituting the sea phase ($M_1$) to the content by mass of the second resin material constituting the island phase ($M_2$) is set to be higher than 1. Consequently, the first resin material and the second resin material are preferably mixed such that the ratio ($M_1/M_2$) of the content by mass of the first resin material constituting the sea phase ($M_1$) to the content by mass of the second resin material constituting the island phase ($M_2$) is higher than 1, thereby allowing the resin material to have a sea-island structure.

The resin material obtained by melt mixing may be used in a pellet form, if necessary.

The tensile elastic modulus of the resin material (tire frame body) itself, as defined in JIS K7113:1995, is preferably from 100 MPa to 1000 MPa, more preferably from 100 MPa to 800 MPa, and particularly preferably from 100 MPa to 700 MPa. When the tensile elastic modulus of the resin material is from 100 MPa to 700 MPa, the tire frame can efficiently be fitted onto a rim even though the shape of the tire frame is maintained.

The tensile yield strength of the resin material (tire frame body) itself, as defined in JIS K7113:1995, is preferably 5 MPa or greater, preferably from 5 MPa to 20 MPa, and more preferably from 5 MPa to 17 MPa. When the tensile yield strength of the resin material is 5 MPa or greater, the resin material can withstand deformation under load applied to the tire, for example, during running.

The tensile yield elongation of the resin material (tire frame body) itself, as defined in JIS K7113:1995, is preferably 10% or greater, preferably from 10% to 70%, and more preferably from 15% to 60%. When the tensile yield elongation of the resin material is 10% or greater, the elastic region is large, and good fittability onto a rim can be achieved.

The tensile fracture elongation of the resin material (tire frame body) itself, as defined in JIS K7113:1995, is preferably 50% or greater, preferably 100% or greater, more preferably 150% or greater, and particularly preferably 200% or greater. When the tensile fracture elongation of the resin material is 50% or greater, fittability onto a rim is excellent, and the susceptibility to breakage on impact can be reduced.

The deflection temperature under load of the resin material (tire frame body) itself, as defined in ISO75-2 or ASTM D648 (at a load of 0.45 MPa), is preferably 50° C. or higher, preferably from 50° C. to 150° C., and more preferably from 50° C. to 130° C. A deflection temperature under load of the resin material of 50° C. or higher enables deformation of the tire frame body to be suppressed even in a case in which vulcanization is performed during tire manufacture.

First Embodiment

A tire according to a first embodiment of the tire according to the invention is described below with reference to the drawings.

Figure 1B:
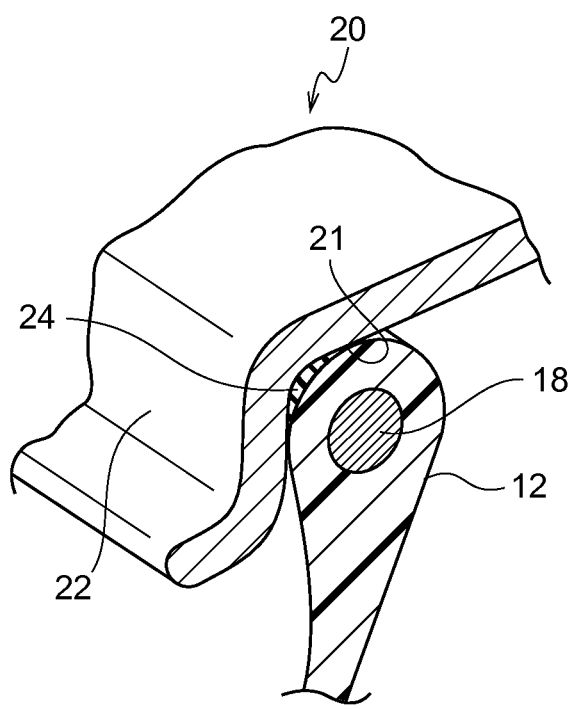
FIG. 1B is a cross-sectional view of a bead portion that has been fitted onto a rim in an embodiment of the invention.

A tire 10 according to the present embodiment is described below. FIG. 1A is a perspective view illustrating a cross-section of a portion of the tire according to an embodiment of the invention. FIG. 1B is a cross-sectional view of a bead portion fitted to a rim. As illustrated in FIG. 1, the tire 10 according to the present embodiment exhibits a cross-sectional shape that is substantially the same as that of an ordinary conventional rubber-made pneumatic tire.

As illustrated in FIG. 1A, the tire 10 includes a tire case 17 composed of:

a pair of bead portions 12 each contacting with a bead seat 21 and a rim flange 22 of a rim 20 illustrated in FIG. 1B;

side portions 14 that respectively extend from the bead portions 12 toward the tire radial direction outer side; and a crown portion 16 (outer circumferential portion) that connects together the tire radial direction outer end of one side portion 14 and the tire radial direction outer end of the other side portion 14.

The tire case 17 according to the present embodiment is configured using a resin material including a thermoplastic polyamide-based elastomer (for example VESTAMID E55-K1W2 manufactured by Daicel-Evonik Ltd. having a tensile elastic modulus of 201 MPa) as a first resin material for constituting a sea phase, and using a high density polyethylene resin (for example NIPOLON HARD Z manufactured by Tosoh Corporation having a tensile elastic modulus of 1010 MPa) as a second resin material for constituting an island phase that is harder than the sea phase, in a ratio of the content by mass of the first resin material M1: the content by mass of the second resin material M2 of 90:10.

Although the tire case 17 according to the present embodiment is formed of a single resin material (a thermoplastic polyamide-based elastomer+high density polyethylene resin), the invention is not limited to this configuration, and, similarly to ordinary conventional rubber-made pneumatic tires, resin materials having different characteristics may be used for the respective portions of the tire case 17 (such as the side portions 14, the crown portion 16 and the bead portions 12). A reinforcing material (such as fiber, cord, nonwoven fabric, or woven fabric formed of a polymer material or a metal) may be disposed to be embedded in the tire case 17 (for example, in the bead portions 12, in the side portions 14, or in the crown portion 16) so as to reinforce the tire case 17 with the reinforcing material.

The tire case 17 according to the present embodiment is formed by bonding together a pair of tire case half parts (tire frame pieces) 17A formed of the resin material having a sea-island structure, which contains the thermoplastic polyamide-based elastomer as the sea phase and the high density polyethylene resin as the island phase. The tire case half part 17A is formed by placing circular tire case half parts 17A that have the same shape and that are obtained by molding one bead portion 12, one side portion 14, and a half the width of the crown portion 16 as an integral body by injection molding or the like, to face each other, and bonding together the half parts to each other at the tire equatorial plane portion. The tire case 17 is not limited to that formed by bonding two members, and may be formed by bonding three or more members.

The tire case half parts 17A formed from the resin material may be molded by, for example, vacuum molding, pressure molding, injection molding, or melt casting. Therefore, when compared to conventional cases in which a tire case is molded from rubber, it is not necessary to perform vulcanization, as a result of which the manufacturing process can remarkably be simplified, and the molding time can be saved.

In the present embodiment, the tire case half parts 17A have a left-right symmetrical shapes, namely one of the tire case half parts 17A and the other of the tire case half parts 17A have the same shape as each other; therefore, there is an advantage in that the tire case half parts 17A can be molded using only one type of mold.

In the present embodiment, as illustrated in FIG. 1B, an annular bead core 18 formed of steel cord is embedded in each bead portion 12, similarly to ordinary conventional pneumatic tires. However, the invention is not limited to such a configuration, and the bead core 18 may be omitted as long as the rigidity of the bead portions 12 is ensured, and there is no trouble in fitting onto the rim 20. Other than steel cord, the bead core 18 may be formed of, for example, an organic fiber cord, a resin-coated organic fiber cord, or a hard resin.

In the present embodiment, an annular sealing layer 24 formed of a material having higher sealing properties than those of the resin material forming the tire case 17, for example rubber, is provided on a part of the bead portion 12 that contact the rim 20 or at least on a part of the bead portion 12 that contacts the rim flange 22 of the rim 20. The sealing layer 24 may also be provided in a part in which the tire case 17 (the bead portion 12) and the bead seat 21 contact each other. A material softer than the resin material that constitutes the tire case 17 may be used as the material having higher sealing properties than those of the resin material that constitutes the tire case 17. It is preferable to use, as a rubber usable for the sealing layer 24, the same type of rubber as a rubber used on outer surface of a bead portion of an ordinary conventional rubber-made pneumatic tire. When the sealing between the bead portion 12 and the rim 20 can be ensured only with resin material that forms the tire case 17, the rubber sealing layer 24 may be omitted, or another thermoplastic resin (thermoplastic elastomer) having higher sealing properties than those of the resin material described above may be used. Examples of such other thermoplastic resins include resins such as a polyurethane-based resin, a polyolefin-based resin, a polystyrene-based resin, and a polyester resin, and a blend of any of these resins with a rubber or an elastomer. Thermoplastic elastomers can also be used, and examples thereof include a thermoplastic polyester-based elastomer, a thermoplastic polyurethane-based elastomer, a thermoplastic polystyrene-based elastomer, and a thermoplastic polyolefin-based elastomer, and any combination of these elastomers and a blend of any of these elastomers with a rubber.

As illustrated in FIG. 1, in the crown portion 16, a reinforcing cord 26 having higher rigidity than that of the resin material constituting the tire case 17 is wound in the circumferential direction of the tire case 17. The reinforcing cord 26 is wound in helically wound to form a reinforcing cord layer 28 in a state in which at least a part of the reinforcing cord 26 is embedded in the crown portion 16 in cross-sectional view taken along the axial direction of tire case 17. A tread 30 formed of a material, such as rubber, having higher abrasion resistance than that of the resin material constituting the tire case 17 is disposed on the outer circumferential side in the tire radial direction of the reinforcing cord layer 28.

Figure 2:
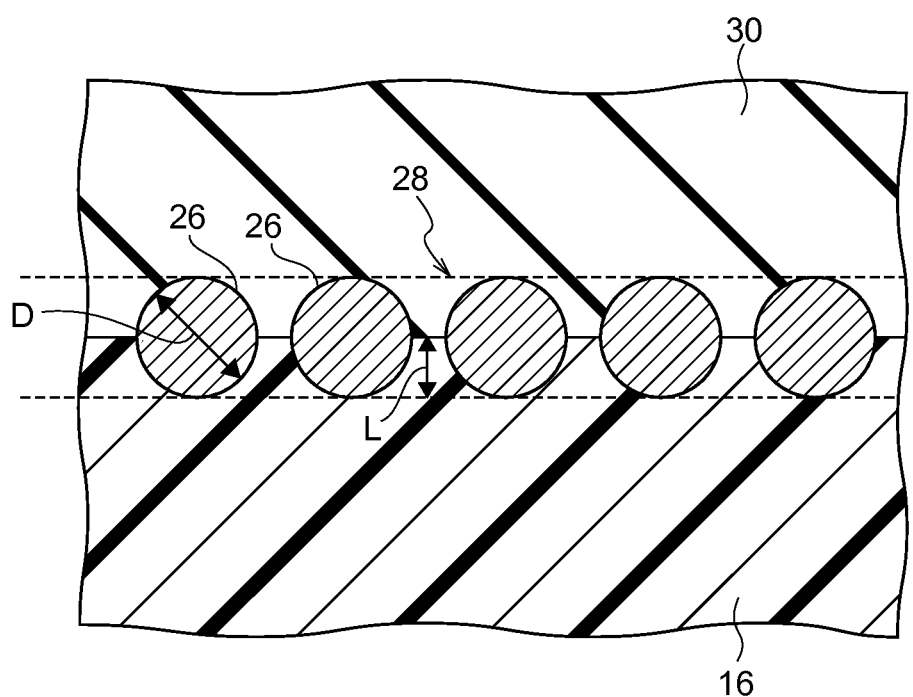
FIG. 2 is a cross-sectional view taken along the tire rotation axis, illustrating a state in which reinforcing cord is embedded in a crown portion of a tire case of a tire according to a first embodiment.

The reinforcing cord layer 28 formed by the reinforcing cord 26 is described below with reference to FIG. 2. FIG. 2 is a cross-sectional view taken along the tire rotation axis, which illustrates a state in which the reinforcing cord is embedded in the crown portion of the tire case of the tire according to the first embodiment. As illustrated in FIG. 2, the reinforcing cord 26 is helically wound in a state in which at least a part of the reinforcing cord 26 is embedded in the crown portion 16 in a cross-sectional view taken along the axial direction of the tire case 17, and, together with a part of the outer circumferential portion of the tire case 17, forms the reinforcing cord layer 28 specified by the intermittent lines in FIG. 2. The part of the reinforcing cord 26 that is embedded in the crown portion 16 is in close contact with the resin material constituting the crown portion 16 (the tire case 17). A monofilament (single filament) of a metal fiber, an organic fiber, or the like, or a multifilament (stranded filament) in which fibers are stranded, such as a steel cord composed of stranded steel fibers, may be used as the reinforcing cord 26. In the present embodiment, a steel cord is used as the reinforcing cord 26.

The depth L of embedding in FIG. 2 illustrates the depth of embedding of the reinforcing cord 26 in the tire case 17 (the crown portion 16) along the tire rotation axis direction. The depth L of embedding of the reinforcing cord 26 in the crown portion 16 is preferably equal to or greater than ⅕ of the diameter D of the reinforcing cord 26, and more preferably more than ½ of the diameter D of the reinforcing cord 26. It is most preferable for the entire reinforcing cord 26 to be embedded in the crown portion 16. When the depth L of embedding of the reinforcing cord 26 is more than ½ of the diameter D of the reinforcing cord 26, the reinforcing cord 26 is difficult to drop off from the embedded portion due to the dimensions of the reinforcing cord 26. When the reinforcing cord 26 is entirely embedded in the crown portion 16, the surface (the outer circumferential surface) becomes flat, whereby entry of air into an area around the reinforcing cord can be suppressed even when a member is placed on the crown portion 16 in which the reinforcing cord 26 is embedded. The reinforcing cord layer 28 corresponds to a belt disposed on the outer circumferential surface of a carcass of a conventional rubber-made pneumatic tire.

As described above, the tread 30 is disposed on the outer circumferential side in the tire radial direction of the reinforcing cord layer 28. It is preferable that the same type of rubber as that used for conventional rubber-made pneumatic tires is used as the rubber used for the tread 30. It is possible to use, in place of the tread 30, a tread formed of another type of resin material having higher abrasion resistance than that of the resin material constituting the tire case 17. In the tread 30, a tread pattern composed of plural grooves is formed on the contact surface that comes into contact with a road surface, similarly to conventional rubber-made pneumatic tires.

A method of manufacturing a tire according to the present embodiment is described below.

Tire Case Forming Process

First, tire case half parts supported by thin metal support rings are aligned to face each other. Subsequently, a jointing mold, not illustrated in the drawings, is placed so as to contact the outer circumferential surface of a portion (contact portion) at which the tire case half parts are contacted with each other. The jointing mold is configured to pressurize a region at or around the bonding section (the contact portion) of the tire case half parts A with a predetermined pressure. Then, the region at or around the bonding section of the tire case half parts is pressurized at a temperature equal to or higher than the melting point (or softening point) of the resin material that constitutes the tire case. When the bonding section of the tire case half parts is heated and pressurized by the jointing mold, the bonding section is melted, and the tire case half parts are fused with each other, as a result of which the members are integrated to form the tire case 17. Although the bonding section of the tire case half parts is heated using the jointing mold in the present embodiment, the invention is not limited to this configuration; heating of the bonding section may be carried out using, for example, a separately provided high frequency heater, or the tire case half parts may be bonded by softening or melting the bonding section, in advance, via application of hot air, irradiation with infrared radiation, or the like, and pressurizing the bonding section using the jointing mold. The tire case half parts may thus be bonded together.

Reinforcing Cord Member Winding Process

Figure 3:
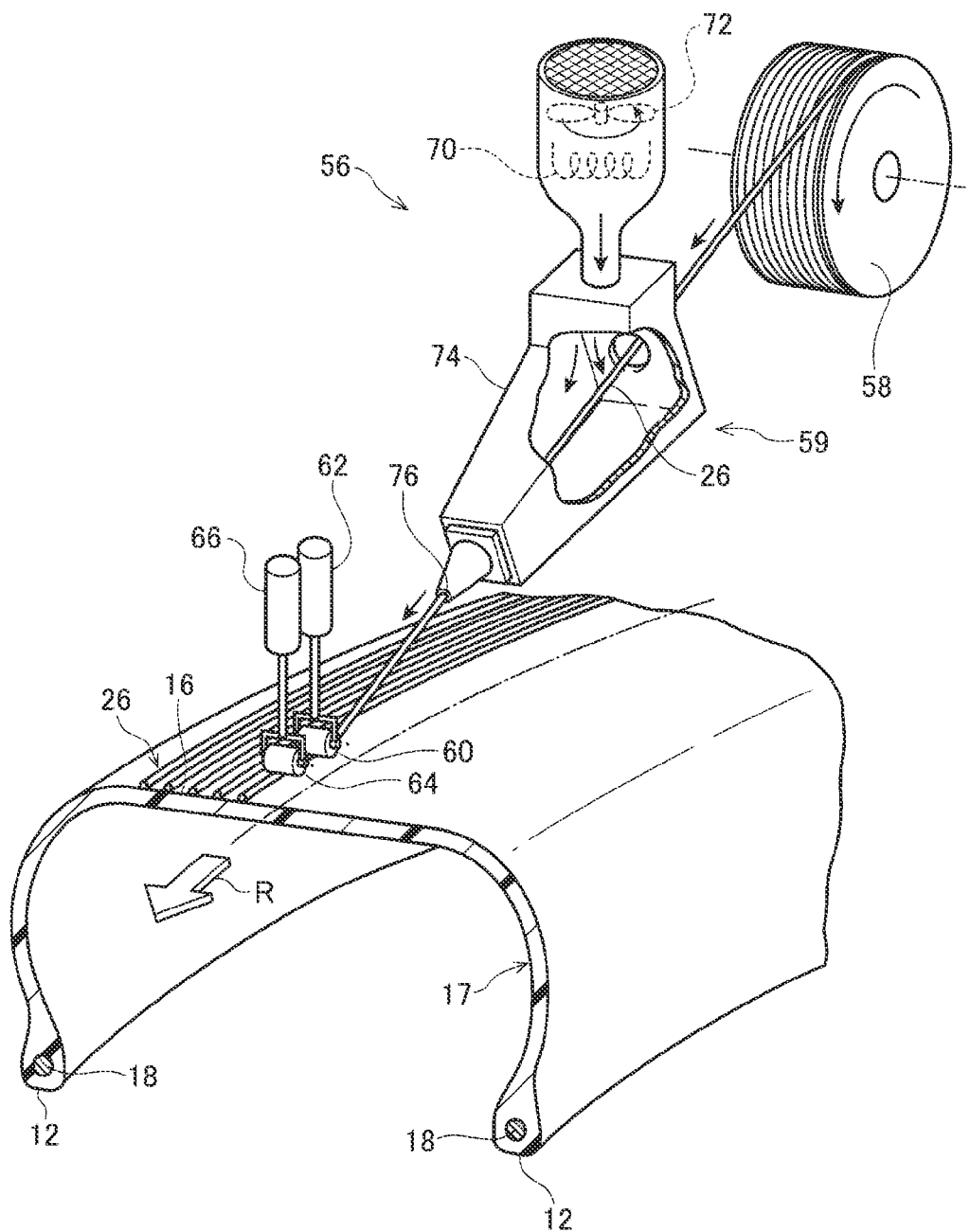
FIG. 3 is an explanatory diagram to explain an operation to embed the reinforcing cord in the crown portion of a tire case using a cord heating device and rollers.

Next, a reinforcing cord winding process is described with reference to FIG. 3. FIG. 3 is an explanatory diagram explaining an operation to embed the reinforcing cord in the crown portion of a tire case using a cord heating device and rollers. In FIG. 3, a cord feeding apparatus 56 includes: a reel 58 on which a reinforcing cord 26 is wound; a cord heating device 59 disposed at the downstream side in the cord conveying direction of the reel 58; a first roller 60 disposed at the downstream side in the reinforcing cord 26 conveying direction; a first cylinder device 62 for moving the first roller 60 in directions in which the first rollers comes into contact with and get away from the outer circumferential surface of tire; a second roller 64 disposed at the downstream side in the reinforcing cord 26 conveying direction of the first roller 60; and a second cylinder device 66 for moving the second roller 64 in directions in which the second roller comes into contact with and get away from the outer circumferential surface of the tire. The second roller 64 can be used as a cooling roller formed of metal. In the present embodiment, the surface of the first roller 60 or the second roller 64 is coated with a fluorine resin (TEFLON (registered trademark) in the case of the present embodiment) with a view to suppressing adhesion of the melted or softened resin material. Although the cord feeding apparatus 56 is configured to have two rollers of the first roller 60 and the second roller 64 in the present embodiment, the invention is not limited to this configuration, and the cord feeding apparatus may be configured to have only one of these rollers (that is, a single roller).

The cord heating device 59 includes a heater 70 and a fan 72 that generate hot air. The cord heating device 59 includes a heating box 74 into which hot air is supplied and in which the reinforcing cord 26 passes through the inside space thereof, and a discharge outlet 76 through which the heated reinforcing cord 26 is discharged.

In the present process, first, the temperature of the heater 70 of the cord heating device 59 is increased, and the air around the heater 70 heated by the heater 70 is sent to the heating box 74 by an air current generated by the rotation of the fan 72. Then, the reinforcing cord 26 drawn out from the reel 58 is fed to the inside of the heating box 74, of which the inner space is heated with hot air, whereby the reinforcing cord 26 is heated (for example, to increase the temperature of the reinforcing cord 26 to be approximately 100° C. to 200° C.). The heated reinforcing cord 26 passes through the discharge outlet 76, and is helically wound, with a constant tension, around the outer circumferential surface of the crown portion 16 of the tire case 17 rotating in the direction of arrow R in FIG. 3. Here, as a result of the heated reinforcing cord 26 coming into contact with the outer circumferential surface of the crown portion 16, the resin material at the contact portion is melted or softened, and at least a part of the heated reinforcing cord 26 is embedded in the outer circumferential surface of the crown portion 16. In this process, since the heated reinforcing cord 26 is embedded in the melted or softened resin material, a state is achieved in which there are no gaps between the resin material and the reinforcing cord 26, namely a close contact state. Accordingly, the incorporation of air into the portion in which the reinforcing cord 26 is embedded is suppressed. By heating the reinforcing cord 26 to a temperature higher than the melting point or softening point of the resin material forming the tire case 17, the melting or softening of the resin material in the portion contacting the reinforcing cord 26 is promoted. By employing this configuration, embedding of the reinforcing cord 26 in the outer circumferential surface of the crown portion 16 is facilitated, and the incorporation of air can effectively be suppressed.

The depth L of embedding of the reinforcing cord 26 can be adjusted by the heating temperature for the reinforcing cord 26, the tension acting on the reinforcing cord 26, the pressure of the first roller 60, and the like. In the present embodiment, the depth L of embedding of the reinforcing cord 26 is set to be equal to or greater than $1/5$ of the diameter D of the reinforcing cord 26. The depth L of embedding of the reinforcing cord 26 is more preferably more than $1/2$ of the diameter D of the reinforcing cord 26, and it is most preferable that the entire reinforcing cord 26 is embedded.

In this way, a reinforcing cord layer 28 is formed on the outer circumferential side of the crown portion 16 of the tire case 17 by winding the heated reinforcing cord 26 on the outer circumferential surface of the crown portion 16 such that the heated reinforcing cord 26 is embedded in the outer circumferential surface of the crown portion 16.

Then, a belt-shaped vulcanized tread 30 is wound on the outer circumferential surface of the tire case 17 for one revolution, and the tread 30 is bonded to the outer circumferential surface of the tire case 17 using, for example, an adhesive. For example, precured treads known thus far for use in retreaded tires may be used as the tread 30. The present process is a process similar to the process of bonding a precured tread to the outer circumferential surface of a casing of a retreaded tire.

A tire 10 can be completed by bonding a sealing layer 24 formed of a vulcanized rubber to the bead portion 12 of the tire case 17 using, for example, an adhesive.

Effects

In the tire 10 according to the present embodiment, the tire case 17 is formed of a resin material having a sea-island structure including a thermoplastic polyamide-based elastomer as the sea phase and a high density polyethylene resin as the island phase. Due to this configuration, the tire 10 according to the invention has a suitably high elastic modulus, and does not readily soften even at high temperatures. The tire 10 accordingly has excellent heat resistance properties. Further, the tire 10 has a simple structure and thus has a light weight, as compared to conventional rubber-made tires. Therefore, the tire 10 according to the present embodiment has high capacity to tolerate friction and has high durability.

In the tire 10 according to the present embodiment, the reinforcing cord 26 having a higher rigidity than that of the resin material is helically wound on the outer circumferential surface of the crown portion 16 of the tire case 17 formed of the resin material, around the circumferential direction. Due to this configuration, the puncture resistance, cut resistance, and rigidity in the circumferential direction of the tire 10 are improved. The improvement in the rigidity in the circumferential direction of the tire 10 prevents creep of the tire case 17 formed of the resin material.

In a cross-sectional view taken along the axial direction of the tire case 17 (the cross-section illustrated in FIG. 1), at least a part of the reinforcing cord 26 is embedded in the outer circumferential surface of the crown portion 16 of the tire case 17 formed of the resin material, and is in close contact with the resin material. Due to this configuration, incorporation of air during manufacture is suppressed, and movement of the reinforcing cord 26 due to, for example, a force applied at the time of travelling is suppressed. Accordingly, separation between the reinforcing cord 26, the tire case 17, and the tread 30 is suppressed from occurring, and the durability of the tire 10 is improved.

In a case in which the reinforcing cord layer 28 is configured to include the resin material as described above, the reinforcing cord 26 can be made to more tightly contact the tire case 17 and fixed to the tire case 17 since the difference in hardness between the tire case 17 and the reinforcing cord layer 28 can be made smaller than that in a case in which the reinforcing cord 26 is fixed using a cushion rubber. Accordingly, the incorporation of air described above can effectively be prevented, and the movement of the reinforcing cord member at the time of travelling can effectively be suppressed.

In a case in which the reinforcing cord 26 is a steel cord, the reinforcing cord 26 can easily be separated from the resin material by heating and recovered at the time of disposing of the tire, and, therefore, there is an advantage from the perspective of recyclability of the tire 10. Further, since the resin material has a lower loss coefficient (tan δ) than that of vulcanized rubber, inclusion of a large amount of the resin material in the reinforcing cord layer 28 makes it possible to enhance the rolling properties of the tire. Compared with vulcanized rubbers, the resin material has advantages in terms of high in-plane shear stiffness, excellent steering stability at the time of travelling with the tire, and excellent abrasion resistance.

As illustrated in FIG. 2, the depth L of embedding of the reinforcing cord 26 is set to be equal to or greater than $1/5$ of the diameter D thereof. Therefore, the incorporation of air during manufacture is effectively suppressed, and movement of the reinforcing cord 26 due to, for example, a force applied at the time of travelling is further suppressed.

Since the tread 30 that contacts the road surface is formed of a rubber material having higher abrasion resistance than that of the resin material forming the tire case 17, the abrasion resistance of the tire 10 is improved.

Since the annular bead core 18 formed of a metal material is embedded in the bead portion 12, the tire case 17 is strongly fixed to the rim 20, i.e., the tire 10 is strongly fixed to the rim 20, similarly to conventional rubber-made pneumatic tires.

Since the sealing layer 24 formed of a rubber material having higher sealing ability than that of the resin material constituting the tire case 17 is disposed in a region of the bead portion 12 that contacts the rim 20, sealing between the tire 10 and the rim 20 is improved. Therefore, compared with cases in which sealing is carried out only with the rim 20 and the resin material constituting the tire case 17, air leakage from inside the tire is further suppressed. Further, the fittability onto a rim is improved by providing the sealing layer 24.

Although a configuration in which the reinforcing cord 26 is heated such that a portion of the surface of the tire case 17 that contacts the heated reinforcing cord 26 is melted and softened is adopted in the embodiment described above, the invention is not limited to this configuration; instead of heating the reinforcing cord 26, a hot airflow generation device may be used to heat the outer circumferential surface of the crown portion 16 in which the reinforcing cord 26 is to be embedded, and the reinforcing cord 26 may thereafter be embedded in the crown portion 16.

Although the heat source of the cord heating device 59 includes the heater and the fan in the first embodiment, the invention is not limited to this configuration, and a configuration in which the reinforcing cord 26 is directly heated by radiation heat (for example, infrared radiation) may be adopted.

Although a configuration in which a region at which the resin material with the reinforcing cord 26 embedded therein is melted or softened is forcibly cooled with the second roller 64 formed of metal is adopted in the first embodiment, the invention is not limited to this configuration; a configuration in which cold airflow is directly applied to the region at which the resin material is melted or softened, to forcibly cool and solidify the region at which the resin material is melted or softened may also be adopted.

Although a configuration in which the reinforcing cord 26 is heated is adopted in the first embodiment, a configuration in which the outer circumference of the reinforcing cord 26 is coated with the same resin material as that of the tire case 17, for example, may be adopted. In this case, by heating the coated resin material along with the reinforcing cord 26 when the coated reinforcing cord is wound on the crown portion 16 of the tire case 17, incorporation of air during embedding the reinforcing cord in the crown portion 16 can effectively be suppressed.

Helically winding the reinforcing cord 26 is easy from the viewpoint of manufacture. However, a method in which the reinforcing cord 26 is provided so as to be discontinuous in the width direction may also be contemplated.

The tire 10 according to the first embodiment is what is referred to as a tubeless tire, in which an air chamber is formed between the tire 10 and the rim 20 by fitting the bead portions 12 to the rim 20. However, the invention is not limited to this configuration, and a complete tube shape may be adopted.

Second Embodiment

Figure 4B:
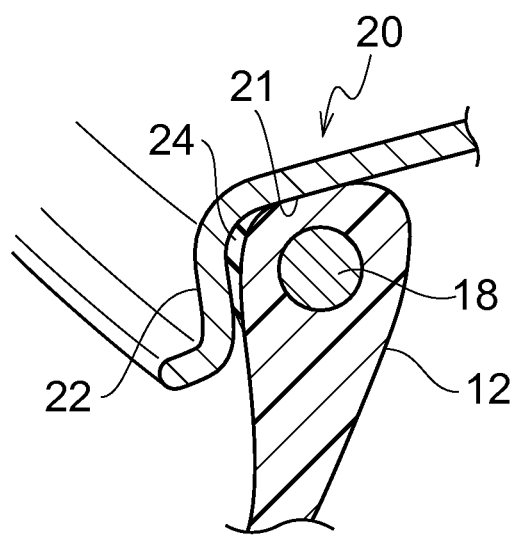
FIG. 4B is an enlarged view of a cross-section taken along the tire width direction of a bead portion of a tire according to an embodiment of the invention, in a state in which the tire is fitted onto a rim.
Figure 5:
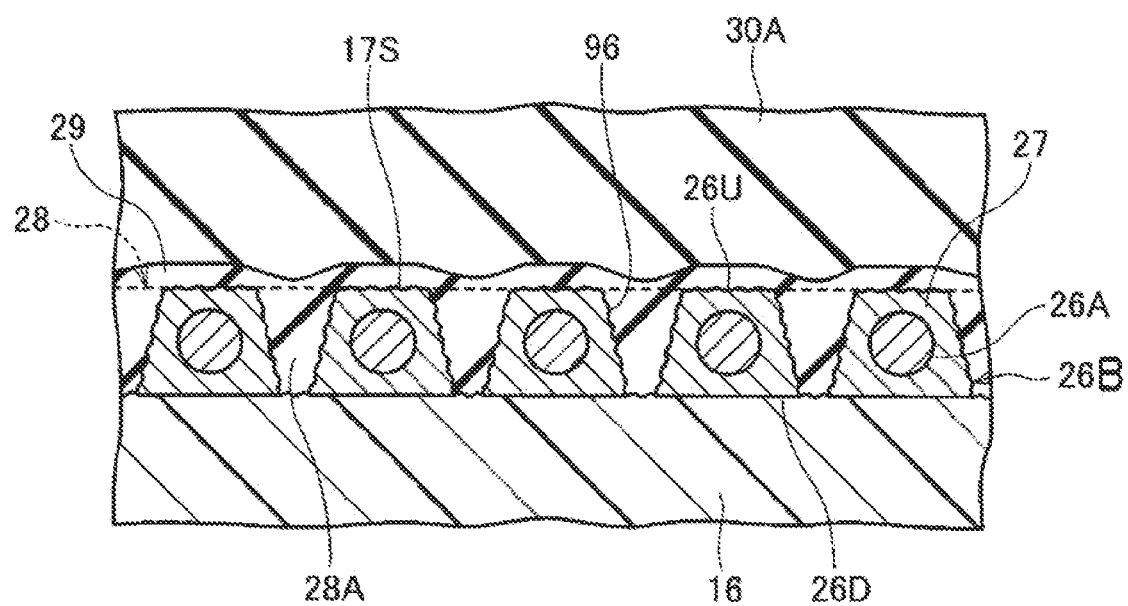
FIG. 5 is a cross-sectional view taken along the tire width direction and illustrating regions surrounding a reinforcing layer of a tire according to a second embodiment.

A second embodiment of the method of manufacturing a tire and the tire according to the invention is described below with reference to the drawings. Similarly to the first embodiment, the tire according to the present embodiment has substantially the same cross-sectional shape as those of ordinary conventional rubber-made pneumatic tires. Accordingly, in the following drawings, the same elements as those described in the first embodiment are designated by the same reference numerals as those employed in the first embodiment. FIG. 4A is a cross-sectional view taken along the tire width direction of the tire according to the second embodiment, and FIG. 4B is an enlarged view of a cross-section taken along the tire width direction of a bead portion in a state in which the tire according to the second embodiment is fitted to a rim. FIG. 5 is a cross-sectional view taken along the tire width direction, which illustrates a region around a reinforcing layer of the tire according to the second embodiment.

Similarly to the first embodiment described above, a tire case 17 of the tire according to the second embodiment is configured using a resin material that includes: a thermoplastic polyamide-based elastomer (for example VESTAMID E55-K1W2 manufactured by Daicel-Evonik Ltd.: tensile elastic modulus 201 MPa) as a first resin material constituting a sea phase; and a high density polyethylene resin (for example NIPOLON hard Z manufactured by Tosoh Corporation: tensile elastic modulus 1010 MPa) as a second resin material constituting an island phase, the island phase being harder than the sea phase, and the content by mass of the first resin material M1: the content by mass of the second resin material M2 being 90:10.

In a tire 200 according to the present embodiment, a reinforcing cord layer 28 (illustrated by the intermittent line in FIG. 5) constituted by a coated cord member 26B wound in the circumferential direction is superposed on the crown portion 16, as illustrated in FIG. 4A and FIG. 5. The reinforcing cord layer 28 constitutes the outer circumferential portion of the tire case 17, and reinforces the rigidity in the circumferential direction of the crown portion 16. The outer circumferential surface of the reinforcing cord layer 28 is included in the outer circumferential surface 17S of the tire case 17.

The coated cord member 26B is formed by a cord member 26A that has higher rigidity than the resin material forming the tire case 17, and that is coated with a coating resin material 27 as another member than the resin material forming the tire case 17. In regions in which the coated cord member 26B contacts the crown portion 16B, the coated cord member 26B and the crown portion 16 are bonded (for example, welded, or adhered with an adhesive) to each other.

The elastic modulus of the coating resin material 27 is preferably set to be within a range of from 0.1 times to 10 times the elastic modulus of the resin material forming the tire case 17. In a case in which the elastic modulus of the coating resin material 27 is equal to or less than 10 times the elastic modulus of the resin material forming the tire case 17, the crown portion is not excessively hard, and the fittability to a rim is enhanced. In a case in which the elastic modulus of the coating resin material 27 is equal to or higher than 0.1 times that of the elastic modulus of the resin material forming the tire case 17, the resin constituting the reinforcing cord layer 28 is not excessively soft, and the in-plane shear stiffness of the belt is excellent, whereby cornering force is improved. In the present embodiment, the same material as the resin material forming the tire frame body is used as the coating resin material 27.

As illustrated in FIG. 5, the coated cord member 26B has a substantially trapezoidal cross-sectional shape. In the following description, the top face (the outer face in the tire radial direction) of the coated cord member 26B is designated by reference numeral 26U, and the bottom face (the inner face in the tire radial direction) is designated by reference numeral 26D. Although a configuration in which the cross-sectional shape of the coated cord member 26B is substantially trapezoidal is adopted in the present embodiment, the invention is not limited to this configuration; any shape may be used other than a shape in which the width of the cross-sectional shape increases on progression from the bottom face 26D side (the inner side in the tire radial direction) to the top face 26U side (the outer side in the tire radial direction).

As illustrated in FIG. 5, since the coated cord members 26B are disposed running in the circumferential direction, at intervals so as to form gaps 28A between adjacent coated cord members 26B. The outer circumferential surface of the reinforcing cord layer 28 accordingly has irregularities, and the outer circumferential surface 17S of the tire case 17 of which the outer circumferential portion is formed of the reinforcing cord layer 28 also has irregularities.

Fine roughening undulations are uniformly formed on the outer circumferential surface 17S (including irregularities) of the tire case 17, and a cushion rubber 29 is bonded thereon with a bonding agent therebetween. The rubber portion at the inner side in the radial direction of the cushion rubber 29 has flowed into the roughening undulations.

A tread 30 formed of a material, such as rubber, having higher abrasion resistance than the resin material forming the tire case 17 is bonded onto the cushion rubber 29 (the outer circumferential surface of the cushion rubber 29).

The rubber to be used in the tread 30 (a tread rubber 30A) is preferably the same type of rubber as the rubber used for conventional rubber-made pneumatic tires. In place of the tread 30, a tread formed of another type of resin material having higher abrasion resistance than that of the resin material forming the tire case 17 may be used. A tread pattern (not illustrated in the drawings) having plural grooves is formed on a face of the tread 30 that contacts the road surface, similarly to in a conventional rubber-made pneumatic tire.

Next, a method of manufacturing a tire according to the present embodiment is described.

Frame Molding Process

First, tire case half parts 17A are formed in the same way as in the first embodiment described above, and the tire case half parts are heated and pressurized using a jointing mold, thereby forming a tire case 17.

Reinforcing Cord Member Winding Process

A tire manufacture apparatus according to the present embodiment is similar to that in the first embodiment described above. Specifically, in the cord feeding apparatus 56 illustrated in FIG. 3 as described in the first embodiment, a coated cord member 26B which has a substantially trapezoidal cross-sectional shape, and which is obtained by coating the cord member 26A with the coating resin material 27 (the same resin material as that of the tire case in the present embodiment), and which is wound on the reel 58, is used.

First, the temperature of the heater 70 is increased, and the air around the heater 70 heated by the heater 70 is sent to the heating box 74 by an air current generated by the rotation of the fan 72. The coated cord member 26B drawn out from the reel 58 is then fed to the inside of the heating box 74 of which the internal space is heated with hot airflow, whereby the coated cord member is heated (for example, to increase the temperature of the outer circumferential surface of the coated cord member 26B to be equal to or higher than the melting point (or softening point) of the coating resin material 27). Here, as a result of the heating of the coated cord material 26B, the coating resin material 27 go into a melted or softened state.

The coated cord member 26B passes through the discharge outlet 76, and is helically wound at a constant tension around the outer circumferential surface of the crown portion 16 of the tire case 17 rotating in the direction towards the nearside on the page. On doing so, the bottom face 26D of the coated cord member 26B comes into contact with the outer circumferential surface of the crown portion 16. The coating resin material 27 in the melted or softened state at the contact portion spreads on the outer circumferential surface of the crown portion 16, and the coated cord member 26B is welded to the outer circumferential surface of the crown portion 16. Thereby, the bonding strength between the crown portion 16 and the coated cord member 26B is increased.

Roughening Treatment Process

Then, in a blasting apparatus not illustrated in the drawings, a blasting abrasive is shot at high speed to the outer circumferential surface 17S of the tire case 17 while the tire case 17 is rotated. The blasting abrasive that has been shot collides with the outer circumferential surface 17S, to form minute roughening undulations 96 with an arithmetic roughness average Ra of 0.05 mm or more on the outer circumferential surface 17S.

By forming the minute roughening undulations 96 on the outer circumferential surface 17S of the tire case 17 in this manner, the outer circumferential surface 17S is made hydrophilic, and the wettability of the bonding agent described below is improved.

Superposing Process

Then, a bonding agent is applied to the outer circumferential surface 17S of the tire case 17 that has been subjected to roughening treatment.

The bonding agent is not particularly limited, and may be, for example, a triazinethiol-based adhesive, a chlorinated rubber-based adhesive, a phenol-based resin adhesive, an isocyanate-based adhesive, a halogenated rubber-based adhesive, a rubber-based adhesive or the like. The bonding agent is preferably capable of reacting at a temperature (from 90° C. to 140° C.) at which the cushion rubber 29 can be vulcanized.

A cushion rubber 29 in the unvulcanized state is then wound, for one revolution, on the outer circumferential surface 17S to which the bonding agent has been applied, and a bonding agent such as a rubber cement composition is applied onto the cushion rubber 29. A tread rubber 30A in the vulcanized or semi-vulcanized state is wound thereon for one revolution, to become to be in the green tire case state.

Vulcanization Process

The green tire case is then housed in a vulcanization can or a mold, and is vulcanized. In this process, unvulcanized cushion rubber 29 flows into the roughening undulations 96, which have been formed on the outer circumferential surface 17S of the tire case 17 through the roughening treatment. Once the vulcanization is complete, an anchor effect is exerted by the cushion rubber 29 that has flowed into the roughening undulations 96, and the bond strength between the tire case 17 and the cushion rubber 29 is increased. Namely, the bond strength between the tire case 17 and the tread 30 is enhanced due to the presence of the cushion rubber 29.

The sealing layer 24 formed of a soft material softer than the resin material is then bonded to the bead portions 12 of the tire case 17 using an adhesive or the like, thereby completing the tire 200.

Effects

The tire 200 according to the present embodiment has a suitably high elastic modulus since the tire case 17 is formed of a resin material having a sea-island structure that includes a thermoplastic polyamide-based elastomer as the sea phase and a high density polyethylene resin as the island phase. The tire 200 accordingly provides comfortable ride quality. Since the tire 200 has a simpler structure than those of conventional rubber-made tires, the tire 200 has lighter weight. The tire 200 according to the present embodiment accordingly has high capacity to tolerate friction and high durability.

In the method of manufacturing a tire according to the present embodiment, when the tire case 17 with the cushion rubber 29 and the tread rubber 30A are integrated together, the bonding properties (adhesion properties) is improved by an anchor effect since the outer circumferential surface 17S of the tire case 17 has been subjected to roughening treatment. Further, since the resin material forming the tire case 17 is ploughed due to collision of the blasting abrasive, the wettability of the bonding agent is improved. Therefore, the bonding agent is retained, in a uniformly applied state, on the outer circumferential surface 17S of the tire case 17, whereby the bond strength between the tire case 17 and the cushion rubber 29 can be ensured.

In particular, even in a case in which irregularities are formed on the outer circumferential surface 17S of the tire case 17, a portion surrounding a recess (walls at the recess, the bottom of the recess) is roughened by allowing the blast abrasive to collide with the portion surrounding the recess (the gaps 28A), whereby the bond strength between the tire case 17 and the cushion rubber 29 can be ensured.

Since the cushion rubber 29 is superposed on the roughened area of the outer circumferential surface 17S of the tire case 17, the bond strength between the tire case 17 and the cushion rubber can effectively be ensured.

In the case of vulcanization of the cushion rubber 29 in the vulcanization process, the cushion rubber 29 flows into the roughening undulations that have been formed on the outer circumferential surface 17S of the tire case 17 through the roughening treatment. Once the vulcanization is completed, an anchor effect is exerted by the cushion rubber 29 that has flowed into the roughening undulations, and the bond strength between the tire case 17 and the cushion rubber 29 is enhanced.

In the tire 200 manufactured by the method of manufacturing a tire, the bond strength between the tire case 17 and the cushion rubber 29 is ensured. Namely, the bond strength between the tire case 17 and the tread 30 is ensured due to the presence of the cushion rubber 29. Therefore, separation between the outer circumferential surface 17S of the tire case 17 and the cushion rubber 29 in the tire 200 is suppressed at the time of, for example, traveling.

Since the outer circumferential portion of the tire case 17 is formed of the reinforcing cord layer 28, puncture resistance and cutting resistance are improved, in comparison to a case in which the outer circumferential portion is formed of a member other than the reinforcing cord layer 28.

Since the coated cord member 26B is wound to form the reinforcing cord layer 28, the rigidity in the circumferential direction of the tire 200 is improved. Since the rigidity in the circumferential direction is improved, creeping of the tire case 17 (a phenomenon in which the plastic deformation of the tire case 17 increase with lapse of time under constant stress) is suppressed, and pressure resistance to air pressure applied from the inner side in the tire radial direction is improved.

In a case in which the reinforcing cord layer 28 is configured to include the coated cord member 26B, the coated cord member 26B can be made to more tightly contact the tire case 17 and fixed to the tire case 17 since the difference in hardness between the tire case 17 and the reinforcing cord layer 28 can be made smaller than that in a case in which the reinforcing cord 26A is fixed using the cushion rubber 29 only. Accordingly, the incorporation of air mentioned above can effectively be prevented, and the movement of the reinforcing cord member during travelling can effectively be suppressed.

In a case in which the reinforcing cord 26A is a steel cord, the cord member 26A can easily be separated from the coated cord member 26B by heating and recovered at the time of disposing of the tire, and, therefore, there is an advantage from the perspective of recycling characteristics of the tire 200. Further, since the resin material has a lower loss coefficient (tan δ) than that of vulcanized rubber, inclusion of a large amount of resin material in the reinforcing cord layer 28 makes it possible to enhance the rolling characteristics of the tire. Compared with vulcanized rubbers, the resin material has advantages in terms of high in-plane shear stiffness, excellent steering stability at the time of travelling, and excellent abrasion resistance.

Although irregularities are formed on the outer circumferential surface 17S of the tire case 17 in the present embodiment, the invention is not limited to this configuration, and a configuration in which the outer circumferential surface 17S is formed flat may be adopted.

In the tire case 17, the reinforcing cord layer may be formed by covering, with a covering thermoplastic material, the coated cord member that has been wound on the crown portion of a tire case and bonded thereto. In this case, the coating layer can be formed by ejecting the coating thermoplastic material in a melted or softened state onto the reinforcing cord layer 28. The coating layer may be formed without using an extruder, by heating a welding sheet to a melted or softened state, and attaching the welding sheet to the surface (the outer circumferential surface) of the reinforcing cord layer 28.

Although case divided parts (tire case half parts 17A) are bonded to form the tire case 17 in the second embodiment, the invention is not limited to this configuration, and the tire case 17 may be formed as an integrated body using, for example, a mold.

The tire 200 according to the second embodiment is what is referred to as a tubeless tire in which an air chamber is formed between the tire 200 and the rim 20 by fitting the bead portion 12 to the rim 20. However, the invention is not limited to this configuration, and the tire 200 may have, for example, a complete tube shape.

Although the cushion rubber 29 is disposed between the tire case 17 and the tread 30 in the second embodiment, the invention is not limited to this configuration, and a configuration in which the cushion rubber 29 is not provided may be adopted.

Although a configuration in which the coated cord member 26B is helically wound in on the crown portion 16 is adopted in the second embodiment, the invention is not limited to this configuration, and a configuration in which the coated cord member 26B is wound so as to be discontinuous in the width direction may be adopted.

In the second embodiment, a configuration is adopted in which a thermoplastic material is used as the coating resin material 27 that forms the coated cord member 26B, and in which the coating resin material 27 is heated to a melted or softened state, thereby welding the coated cord member 26B to the outer circumferential surface of the crown portion 16. However, the invention is not limited to this configuration, and a configuration in which the coated cord member 26B is adhered to the outer circumferential surface of the crown portion 16 using an adhesive or the like, without heating the coating resin material 27, may be adopted.

A configuration may be adopted in which the coating resin material 27 that forms the coated cord member 26B is a thermosetting resin, and in which the coated cord member 26B is adhered to the outer circumferential surface of the crown portion 16 using an adhesive or the like, without heating the coated cord member 26B.

A configuration may be adopted in which the coating resin material 27 that forms the coated cord member 26B is a thermosetting resin, and in which the tire case 17 is formed of a resin material. In this case, the coated cord member 26B may be bonded to the outer circumferential surface of the crown portion 16 using an adhesive or the like, or the coated cord member 26B may be welded to the outer circumferential surface of the crown portion 16 by heating a portion of the tire case 17 at which the coated cord member 26B is to be disposed to go into a melted or softened state.

A configuration may be adopted in which the coating resin material 27 that forms the coated cord member 26B is a thermoplastic material, and in which the tire case 17 is formed of a resin material. In this case, the coated cord member 26B may be adhered to the outer circumferential surface of the crown portion 16 using an adhesive or the like, or the coated cord member 26B may be welded to the outer circumferential surface of the crown portion 16 by heating a portion of the tire case 17 at which the coated cord member 26B is to be disposed to go into a melted or softened state as well as heating the coating resin material 27 to go into a melted or softened state. In a case in which both the tire case 17 and the coated cord member 26B are heated to go into a melted or softened state, both materials mix with each other well, thereby increasing the bond strength. In a case in which each of the resin material that forms the tire case 17 and the coating resin material 27 that forms the coated cord member 26B is a resin material, the resin materials thereof are preferably thermoplastic resin materials of the same type, and particularly preferably the same thermoplastic material.

The outer circumferential surface 17S of the tire case 17 that has been subjected to roughening treatment may be subjected to corona treatment, plasma treatment or the like, so as to activate the outer circumferential surface 17S and so as to enhance the hydrophilicity, and an adhesive may thereafter be applied thereto.

The sequence employed in the manufacture of the tire 200 is not limited to the sequence described in the second embodiment, and may be modified, as appropriate.

Although modes for carrying out the invention are described above with reference to embodiment, these embodiments are merely examples, and may be practiced with various modifications within a range not departing from the spirit of the invention. Of course, the protection scope of the invention is not limited to these embodiments.

Although modes for carrying out the invention are described above with reference to embodiment, these embodiments are merely examples, and may be practiced with various modifications within a range not departing from the spirit of the invention. Of course, the protection scope of the invention is not limited to these embodiments.

EXAMPLES

The invention is more specifically described below by reference to examples. However the invention is not limited thereto.

First, tires of Examples and Comparative Examples were formed in accordance with the first embodiment. In this process, the materials listed in the following Table 1 were used as the materials for forming the tire cases. Evaluation of the properties of the materials and evaluation of the tire performance were performed as set out below for each of the Examples and Comparative Examples.

Preparation of Pellets

The first resin material and the second resin material noted in Table 1 were mixed together, and the resultant resin material was kneaded using a twin-screw extruder LABO PLASTOMILL 50MR manufactured by Toyo Seiki Seisaku-sho, Ltd. (at a mixing temperature of from 180° C. to 200° C.), whereby pellets were obtained.

In the Comparative Examples 1 and 2, mixing was not performed, and pellets of a single resin were prepared.

Evaluation of Tensile Elastic Modulus, Tensile Elongation at Break, and Breaking Stress Injection molding from the prepared pellets was performed using a SE30D manufactured by Sumitomo Heavy Industries Co., Ltd. at a molding temperature of from 200° C. to 235° C., and using a mold having a mold temperature of from 50° C. to 70° C., a size of 30 mm×127 mm and a thickness of 2.0 mm, whereby test pieces were obtained. Each of the test pieces was subjected to punching, whereby dumbbell-shaped test pieces as defined in JIS K6251:1993 were prepared (Number 5 shape test pieces).

Then, using a Shimadzu Autograph AGS-J (5KN) manufactured by Shimadzu Corporation, the tensile elastic modulus, elongation at break, and the breaking stress of each of the dumbbell-shaped test pieces was measured at an elongation speed of 200 mm/min. The results are indicated in the following Table 1.

Computation of Index of G' (50° C.)/G' (0° C.)

Injection molding from the prepared pellets was performed using an SE30D manufactured by Sumitomo Heavy Industries Co., Ltd. at a molding temperature of from 200° C. to 235° C., and using a mold having a mold temperature of from 50° C. to 70° C., a size of 30 mm×127 mm and a thickness of 2.0 mm, whereby test pieces were obtained. The index of G' (50° C.)/G' (0° C.) was obtained for each of the obtained test pieces, specifically in the following manner.

Using a dynamic viscoelasticity measuring device ARES III manufactured by Rheometric Inc., the shear storage modulus G' (50° C.) at 50° C. and the shear storage modulus G' (0° C.) at 0° C. were measured for each of the test pieces under conditions of a frequency of 10 Hz and a dynamic strain of 1%, and the value of G' (50° C.)/G' (0° C.) was computed for each kind of pellet.

Then, the magnitude of G' (50° C.)/G' (0° C.) for each kind of pellet relative to the value of G' (50° C.)/G' (0° C.) of the Comparative Example 1 was expressed as an "index of G' (50° C.)/G' (0° C.)" in Table 1. An index of G' (50° C.)/G' (0° C.) lower than 1 indicates that heat resistance is excellent.

Heat Resistance Evaluation

Tires were formed using the resin materials listed in Table 1 in a manner similar to that in the first embodiment described above. The tires were fitted onto rims and inflated to 3 times the standard pressure, the tires were stored at 80° C. for 1 month, and the dimensions of the tires were measured. Deformation of 2 mm or greater was classified as deformed, and heat resistance was evaluated based on the following evaluation criteria.

Evaluation Criteria

A: the tire could be fitted onto a rim and was able to maintain its shape

B: the tire could be fitted onto a rim, but air seal could not be achieved or deformation occurred C: the tire could not be fitted onto a rim The state of the resin material constituting the tire frame body is indicated in Table 1.

Through micrograph observation using a scanning electron microscope (SEM), the resin material was observed to have a structure in which an island phase formed of the second resin material was dispersed in a sea phase formed of the first resin material, or a structure having a single phase formed of the first resin material or the second resin material.

From the results indicated in Table 1, the elastic modulus coefficients of the resin materials of the Examples and the Comparative Examples were computed according to the above Inequality (1), and indicated in Table 1.

This indicates that tires manufactured using tire cases formed from the same resin material as those of the test pieces illustrated in the Examples exhibit excellent heat resistance.

The disclosure of Japanese Patent Application 2012-044644 is incorporated herein by reference in its entirety.

All publications, patent applications, and technical standards mentioned in this specification are herein incorporated by reference to the same extent as if each individual publi-

TABLE 1

| | | | Comparative Example 1 | Example 1 | Example 2 | Comparative Example 2 | Example 3 | Comparative Example 3 | Example 4 | Example 5 | Example 6 |
|---|---|---|---|---|---|---|---|---|---|---|---|
| First Resin Material | Type | VESTAMID E55-K1W2 manufactured by Daicel-Evonik Ltd | 100 | 90 | 80 | — | 80 | — | 98 | 60 | 55 |
| | Properties | Single Body Tensile Elastic Modulus (MPa) | 201 | 201 | 201 | — | 201 | — | 201 | 201 | 201 |
| Second Resin Material | Type | NIPOLON HARD Z manufactured by Tosoh Corporation | — | 10 | 20 | 100 | — | — | 2 | — | — |
| | | ZYLON 200H manufactured by Asahi Kasei Chemicals Corporation | — | — | — | — | 20 | 100 | — | 40 | 45 |
| | Properties | Single Body Tensile Elastic Modulus (MPa) | — | 1020 | 1020 | 1020 | 1150 | 1150 | 1020 | 1150 | 1150 |
| Properties of Resin Material That Forms Tire Frame Body | | | | | | | | | | | |
| 1 | Phase State | | Single Phase | Sea-Island Structure | Sea-Island Structure | Single Phase | Sea-Island Structure | Single Phase | Sea-Island Structure | Sea-Island Structure | Sea-Island Structure |
| 2 | Tensile Elastic Modulus (MPa) | | 201 | 244 | 375 | 1020 | 259 | 1150 | 205.1 | 580.6 | 628.05 |
| 3 | Elongation at Break (%) | | 430 | 570 | 590 | 650 | 410 | 17 | 472 | 264.8 | 244.15 |
| 4 | Breaking Stress (MPa) | | 27 | 34 | 33 | 37 | 17 | 39 | 27.3 | 31.8 | 32.4 |
| 5 | G' (50° C.)/G' (0° C.) | | 0.61 | 0.58 | 0.56 | 0.6 | 0.59 | 1.2 | 0.601 | 0.846 | 0.8755 |
| 6 | Index of G' (50° C.)/G' (0° C.) | | 1.00 | 0.95 | 0.92 | 0.98 | 0.97 | 1.97 | 0.99 | 1.39 | 1.44 |
| 7 | Elastic Modulus Coefficient | | 0.00 | 1.77 | 0.79 | — | 0.70 | — | 9.66 | 0.26 | 0.21 |
| | Heat Resistance Evaluation | | B | A | A | C | A | C | B | A | C |

The components in Table 1 are as follows.
First Resin Material
VESTAMID E55-K1W2 manufactured by Daicel-Evonik Ltd. (thermoplastic polyamide-based elastomer having a tensile elastic modulus of 201 MPa)
Second Resin Material
NIPOLON HARD Z manufactured by Tosoh Corporation (high density polyethylene resin having a tensile elastic modulus of 1010 MPa)
ZYLON 200H manufactured by Asahi Kasei Chemicals Corporation (polyphenylene ether of which the tensile elastic modulus exceeds 1000 MPa)

As demonstrated in Table 1, it can be seen that, in comparison to the test pieces manufactured in the Comparative Examples, the test piece manufactured in each of the Examples had tensile elastic modulus, elongation at break, and breaking stress that are not too large or too small, demonstrating that the test piece manufactured in each of the Examples had appropriate strength. In particular, in Examples in which the elastic modulus coefficient was in the range of from 0.25 to 2, the shape was maintained, and the heat resistance evaluation result was excellent.

cation, patent application, or technical standard was specifically and individually indicated to be incorporated by reference.

The invention claimed is:
1. A tire comprising a circular tire frame body formed of a resin-containing material, a reinforcing cord layer that comprising at least a reinforcing cord that helically wound on an outer circumferential surface of a crown portion of the tire frame, the resin material having a sea-island structure including a sea phase constituted by a first resin material and an island phase constituted by a second resin material, and the island phase being harder than the sea phase;

wherein an elastic modulus of the resin containing material is 100-700 MPa, the first thermoplastic resin is a thermoplastic polyamide-based elastomer, and the second resin material is a polyphenylene ether, the second resin material has a tensile elastic modulus of 1000 MPa or greater, the content ratio by mass of the first thermoplastic resin to the second resin material is from 70:30 to 80:20, a tensile elastic modulus γ1 of the first resin material and a content W1 of the first resin material in the entire resin-containing material, and a tensile elastic modulus γ2 of the second resin material and a content W2 of the second resin material in the entire resin-containing material satisfy following Inequality (1):

$$0.25 \leq ((\gamma 1 \times W1)/(\gamma 2 \times W2)) \leq 2 \quad \text{Inequality (1)}$$

the reinforcing cord layer is configured to include a resin material, and an outer circumferential portion of the tire frame is formed of the reinforcing cord layer.

2. The tire according to claim 1, wherein the resin material includes at least one selected from the group consisting of an anti-aging agent, an ultraviolet absorber, a flame retardant, and an antistatic agent.

* * * * *